(12) United States Patent
Stoeffler et al.

(10) Patent No.: US 12,510,956 B2
(45) Date of Patent: Dec. 30, 2025

(54) STRAPLESS AUTONOMOUS EXTENDED REALITY VIEWER

(71) Applicant: Intel Corporation, Santa Clara, CA (US)

(72) Inventors: Norbert Stoeffler, Graefelfing (DE); Rafael Rosales, Unterhaching (DE); Kay-Ulrich Scholl, Malsch (DE)

(73) Assignee: Intel Corporation, Santa Clara, CA (US)

( * ) Notice: Subject to any disclaimer, the term of this patent is extended or adjusted under 35 U.S.C. 154(b) by 880 days.

(21) Appl. No.: 17/483,832

(22) Filed: Sep. 24, 2021

(65) Prior Publication Data

US 2022/0011856 A1 Jan. 13, 2022

(51) Int. Cl.
*G06F 3/01* (2006.01)
*B25J 5/02* (2006.01)
*B25J 9/00* (2006.01)
*B25J 9/16* (2006.01)
*B25J 13/08* (2006.01)
*G05D 1/00* (2006.01)
*G06F 3/14* (2006.01)

(52) U.S. Cl.
CPC .............. *G06F 3/011* (2013.01); *B25J 5/02* (2013.01); *B25J 9/0018* (2013.01); *B25J 9/1633* (2013.01); *B25J 9/1684* (2013.01); *B25J 13/085* (2013.01); *B25J 13/089* (2013.01); *G05D 1/0094* (2013.01); *G06F 3/14* (2013.01)

(58) Field of Classification Search
CPC . G06F 3/14; G06F 3/014; G06F 3/012; G06F 3/011; G06F 3/147; G06F 3/016; G05D 1/0094; B25J 13/089; B25J 5/02; G02B 2027/0187
See application file for complete search history.

(56) References Cited

U.S. PATENT DOCUMENTS

| 5,949,002 | A  | * | 9/1999  | Alden       | G01R 31/2887 |
|           |    |   |         |             | 73/866.5     |
| 8,736,600 | B2 | * | 5/2014  | Lin         | G06T 17/05   |
|           |    |   |         |             | 382/280      |
| 9,171,391 | B2 | * | 10/2015 | Smith       | G06T 13/20   |
| 9,522,471 | B2 | * | 12/2016 | Kuffner, Jr.| B25J 19/06   |
| 9,638,022 | B2 | * | 5/2017  | Bittar      | E21B 47/00   |
| 9,821,463 | B2 | * | 11/2017 | Kuffner, Jr.| B25J 19/06   |
| 9,925,013 | B2 | * | 3/2018  | Dell        | A61B 90/361  |
| 10,260,318| B2 | * | 4/2019  | Ahmed       | E21B 41/0035 |
| 10,646,290| B2 | * | 5/2020  | Dell        | A61B 34/32   |
| 11,032,537| B2 | * | 6/2021  | Giokaris    | G06F 3/011   |
| 11,382,713| B2 | * | 7/2022  | Healy       | G06T 7/70    |

(Continued)

OTHER PUBLICATIONS

Bates, Sam; "Canon reveals its own strapless VR device"; https://articles.informer.com/canon-reveals-its-own-strapless-vr-device.html; Informer Technologies, Inc .; retrieved on Sep. 24, 2021, 4 pages.

(Continued)

*Primary Examiner* — Olga V Merkoulova
(74) *Attorney, Agent, or Firm* — Viering, Jentschura & Partner mbB

(57) ABSTRACT

A device including a processor configured to: receive sensor measurements; determine a viewer position based on the received sensor measurements; generate a control signal based on the viewer position; and determine a view based on the viewer position.

20 Claims, 12 Drawing Sheets

(56) References Cited

U.S. PATENT DOCUMENTS

| | | | | |
|---|---|---|---|---|
| 11,612,516 | B2* | 3/2023 | Puglisi | A61F 9/007 |
| | | | | 351/205 |
| 11,819,273 | B2* | 11/2023 | Freeman | A61B 3/12 |
| 11,988,796 | B2* | 5/2024 | Proctor | G06F 3/0346 |
| 12,062,430 | B2* | 8/2024 | Riggs | G16Z 99/00 |
| 12,063,511 | B2* | 8/2024 | Geissler | H04W 12/63 |
| 12,094,595 | B2* | 9/2024 | Freeman | A42B 3/228 |
| 2008/0033656 | A1* | 2/2008 | Herwanger | G01V 1/30 |
| | | | | 702/18 |
| 2011/0234584 | A1* | 9/2011 | Endo | H04N 13/359 |
| | | | | 345/419 |
| 2013/0204588 | A1* | 8/2013 | Copeland | E21B 43/26 |
| | | | | 703/2 |
| 2016/0091968 | A1* | 3/2016 | Angelo | G06F 3/017 |
| | | | | 345/156 |
| 2016/0207199 | A1* | 7/2016 | Kuffner, Jr. | B25J 9/1676 |
| 2017/0043484 | A1* | 2/2017 | Kuffner | B25J 19/06 |
| 2018/0116742 | A1* | 5/2018 | Dell | A61B 34/20 |
| 2018/0250085 | A1* | 9/2018 | Simi | A61B 34/37 |
| 2019/0186255 | A1* | 6/2019 | Mustapha | E21B 47/09 |
| 2019/0331832 | A1* | 10/2019 | Chandra | G01W 1/06 |
| 2020/0038120 | A1* | 2/2020 | Ziraknejad | G06F 3/04815 |
| 2020/0192467 | A1* | 6/2020 | Capgolu | E21B 44/00 |
| 2020/0366886 | A1* | 11/2020 | Giokaris | G06F 3/011 |
| 2021/0022599 | A1* | 1/2021 | Freeman | A61B 3/0025 |
| 2021/0107152 | A1* | 4/2021 | Honkote | B25J 9/1661 |
| 2021/0112417 | A1* | 4/2021 | Geissler | H04W 12/009 |
| 2021/0169581 | A1* | 6/2021 | Calloway | A61B 34/30 |
| 2021/0257084 | A1* | 8/2021 | Freeman | G16H 10/60 |
| 2021/0315662 | A1* | 10/2021 | Freeman | G06F 3/012 |
| 2021/0335483 | A1* | 10/2021 | Freeman | G16H 50/20 |
| 2021/0386503 | A1* | 12/2021 | Healy | G16H 50/20 |
| 2022/0011856 | A1* | 1/2022 | Stoefffler | B25J 13/089 |
| 2022/0211447 | A1* | 7/2022 | Calloway | A61B 34/20 |
| 2022/0308261 | A1* | 9/2022 | Proctor | G06T 17/05 |
| 2024/0312050 | A1* | 9/2024 | Gonzalez Aguirre | G06V 10/70 |

OTHER PUBLICATIONS

Mason; "Compliance and force control for computer-controlled manipulators" IEEE Transactions on Systems, Man and Cybernetics, Jun. 6, 1981; SMC-11, No. 6; pp. 418-432.

Khatib et al; "Motion and force control of robot manipulators"; IEEE International Conference on Robotics and Automation Proceedings; 1986; vol. 3; pp. 1381-1386.

Park et al.; "Multi-contact compliant motion control for robotic manipulators"; Proceedings of the IEEE International Conference on Robotics and Automation New Orleans; Apr. 2004; vol. 5; pp. 4789-4794.

Lefebvre et al: "Task planning with active sensing for autonomous compliant motion"; The International Journal of Robotics Research; Jan. 2005; vol. 24, No. 1; pp. 61-81.

Lefebvre et al. "Active compliant motion: a survey" VSP and Robotics Society of Japan 2005; Advanced Robotics; vol. 19, No. 5; pp. 479-499.

JR3 Inc.; "Products"; https://www.jr3.com/products; retrieved on Sep. 24, 2021, 1 page.

Liu et al.; "Stereo-Based Head Pose Tracking with Motion Compensation Model"; IEEE International Conferenceon Robotics and Biomimetics, Shenyang, China; 2004, pp. 700-704; doi: 10.1109/ROBIO.2004.1521866.

Pimax; https://pimax.com/; retrieved on Sep. 24, 2021, 1 page.

Igloo; https://www.igloovision.com/; retrieved on Sep. 24, 2021, 19 pages.

* cited by examiner

STRAPLESS AUTONOMOUS EXTENDED REALITY VIEWER

TECHNICAL FIELD

This disclosure generally relates to methods and systems of maintaining an optimal extended reality viewer position.

BACKGROUND

Extended Reality devices, such as virtual reality (VR) headsets, may require headstraps to affix a display to a user's head. The headstraps may make the device uncomfortable because of pressures exerted on a user's face and head. Additionally, the weight of the device may apply torque to a user's head and neck. These disadvantages are made worse when a user wears a headset for an extended period of time. Furthermore, the weight and size limitations of a VR headset considerably limit the possible field-of-view and may hinder a user's immersive experience.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various examples of the disclosure are described with reference to the following drawings.

DESCRIPTION

Figure 1:
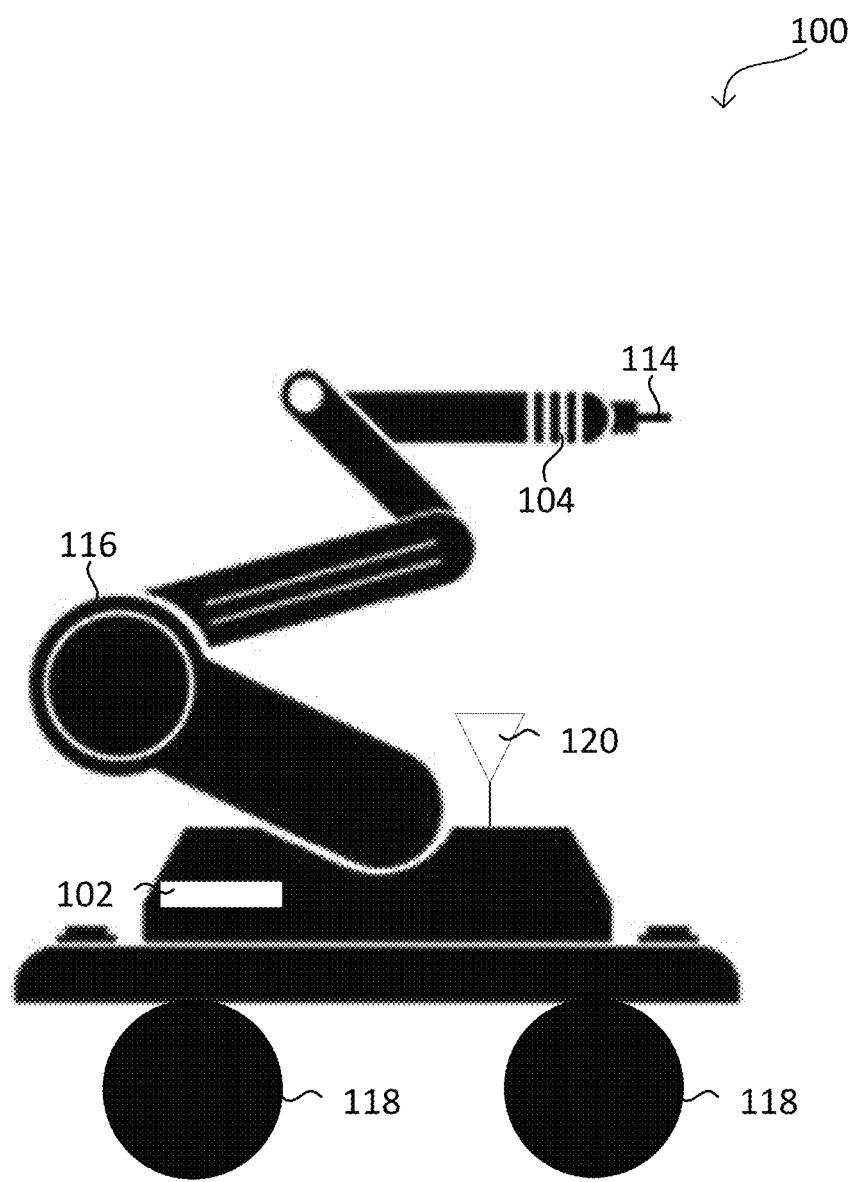
FIG. 1 shows an example of a machine of the present disclosure.

The following detailed description refers to the accompanying drawings that show, by way of illustration, exemplary details in which the present disclosure may be practiced.

The word "exemplary" is used herein to mean "serving as an example, instance, or illustration". Any aspect or design described herein as "exemplary" is not necessarily to be construed as preferred or advantageous over other examples or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as used herein may be understood as any kind of technological entity that allows handling of data. The data may be handled according to one or more specific functions that the processor or controller may execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" as used herein may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where radio-layer components carry out the physical transmission and reception, such as radio frequency (RF) transceivers and antennas, and the processors or controllers perform the logical transmission and reception over the software-level connection. The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions. The term "calculate" encompasses both 'direct' calculations via a mathematical expression/formula/relationship and 'indirect' calculations via lookup or hash tables and other array indexing or searching operations.

A "machine" may be understood to include any type of mechanical structure that uses (e.g., electrical) power to alter its environment, to apply forces, to control movement and/or to perform an intended action, e.g., a mechanical structure programmable by a computer. By way of example, a machine may be a driven object with a combustion engine, a reaction engine, an electrically driven object, a hybrid driven object, or a combination thereof. A machine may be or may include a humanoid machine, a non-humanoid machine, an agricultural machine, a machine tool, a moving machine, a stationary machine, a drone, an industrial machine, a medical operating machine, a collectively operating machine, a ground machine, an aerial machine, an aquatic machine, or a mixture thereof, among others.

The term "automated machine" as used herein (also referred to as a at least partially autonomous machine or as robot) may describe a machine capable of managing one or more tasks (also referred to as task performance) at least partially without human intervention, input, and/or control. Examples of the automated machine may include a hybrid machine, a human assisted machine and/or an autonomous machine. The term "autonomous machine" as used herein (also referred to as autonomous robot) may describe a (e.g., automated) machine capable of managing one or more tasks (also referred to as task performance) without human intervention, input, and/or control. Exemplary components of managing task may include: managing one or more physical tasks (also referred to as task management), planning the task performance, organizing the task performance, scheduling the task performance, switching between two tasks, competing for one or more task, assigning one or more tasks, completing one or more tasks, reporting about completion of the one or more tasks, negotiation of the allocation of one or more tasks (e.g., between multiple autonomous machines), monitoring the progress of one or more tasks, navigate the autonomous machine to one or more positions of one or more tasks (e.g., at which the one or more task require a physical manipulation), etc. References made herein to robots or automated machines may be understood as exemplarily and may analogously apply to any type of autonomous machine, and vice versa. References made herein with regard to one or more autonomous machines may analogously apply to one or more automated machines. The task management may be collaborative, e.g., when multiple robots are allocated to one or more tasks. The robots implementing the collaborative task management may be configured to exchange data related to the task management.

The term "extended reality" (XR) may refer to all real-and-virtual combined environments in human-machine interactions. The environments may be generated from user wearable computing devices. XR may include representative forms such as augmented reality (AR), mixed reality (MR), and virtual reality (VR).

The autonomous machine may implement one or more tasks. A task performance model may be configured to control the autonomous machine to perform the one or more tasks based on input data, e.g., to convert the input data into control instructions. The controller may be configured to transmit the control instructions within the autonomous machine, e.g., in accordance with an in-machine communication protocol (e.g., a fieldbus communication protocol) and/or to one or more actuators of the autonomous machine. Generally, a task performance model may be (e.g., at least in part) rule based and/or may be (e.g., at least in part) based on machine learning.

Examples of the input data may include: data that one or more of the sensors of the autonomous machine sensed, data that the autonomous machine stores (e.g., in a database), data indicating instructions provided to the autonomous machine (e.g., data that an operator or a group leader receives), data about an affiliation of the autonomous machine to a group (also referred to as group affiliation), data about an assignment of the autonomous machine to one or more tasks of the group, data exchanged between multiple autonomous machines (e.g., data transmitted from another autonomous machine of the group), and/or data about a mission (also referred to as mission data). The control instructions may be understood as in-machine instructions to control one or more actuators of the autonomous machine. Examples of the one or more actuators of the autonomous machine may include: one or more actuators configured to cause a motion of the autonomous machine, one or more actuators configured to actuate a tool of the autonomous machine, one or more actuators configured to move the tool (also referred to as effector) of the autonomous machine (e.g., relative to the one or more actuators configured to cause a motion of the autonomous machine), one or more actuators being part of the kinetic chain (e.g., a robotic arm) of the autonomous machine.

For example, the task performance may be based on sensed data (also referred to as sensing result, sensor data, or as sensing data), e.g., measurements by one or more sensors of the autonomous machine or measurements by one or more sensors external to the autonomous machine (e.g., one or more sensors of another autonomous machine). For example, the task performance may be based on information about the environment of the autonomous machine, e.g., information that the one or more sensors of the autonomous machine sensed or information that one or more external sensors sensed. Alternatively, the task performance may be based on a progress of performing one or more tasks that the autonomous machine performs. For example, one or more sensors of the autonomous machine or the one or more external sensors may be configured to sense the progress of navigating an autonomous mobile robot in conjunction with moving a robot arm.

An autonomous machine may utilize one or more machine learning models to perform or control functions of the machine (or other functions described herein). The term "model" used herein may be understood as any kind of algorithm, which provides output data based on input data provided to the model (e.g., any kind of algorithm generating or calculating output data based on input data). A computing system may execute a machine learning model to progressively improve performance of a specific task. Parameters of a machine learning model may be adjusted during a training phase based on training data. A trained machine learning model may be used during an inference phase to make estimations or decisions based on input data. The trained machine learning model may be used to generate additional training data. An additional machine learning model may be adjusted during a second training phase based on the generated additional training data. A trained additional machine learning model may be used during an inference phase to make estimations or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive feedback (also referred to as reward) or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

An autonomous machine as described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify environmental conditions, such as weather conditions and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

An autonomous machine as described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

For example, the controller of an autonomous machine may be configured to train the task performance model based on training data. The training data may include the control instructions, a result of the task performance (also referred to as actual result) and/or a predefined result (also referred to as expected result or target result). For example, the controller may be configured to determine the result of the task performance by sensing the environment of the machine. For example, the predefined result may represent an optimum result or a range of results that are acceptable. Said more generally, the training data may indicate whether the result of the task performance fulfills a predefined criterion, e.g., by comparing the actual result with the predefined result. For example, the criterion may be fulfilled when a deviation of the actual result from the predefined result is zero.

Generally, the actual result and/or the predefined result may be parameterized, e.g., represented by data (also referred to as result data) including one or more parameters as information about the result. For example, the result data may include sensed parameters, such as physical, electrical and/or chemical properties of the result.

Throughout the present disclosure, the following terms may be used as synonyms: parameter set, model parameter set, safety layer parameter set, automated motion model parameter set, and/or the like. These terms may correspond to groups of values used to implement one or more models for directing an autonomous machine to operate according to the manners described herein.

Furthermore, throughout the present disclosure, the following terms may be used as synonyms: parameter, model parameter, safety layer parameter, and/or automated movement model parameter, and/or the like, and may correspond to specific values within the previously described sets.

Extended reality (XR) or VR headsets may require straps to affix a viewer to a user. These may become uncomfortable for extended periods of time and destroy elaborate hairdressings.

Handheld VR viewers exist, but they may only be suitable for a small number of scenarios. Handheld headsets are only a solution for niche environments which only require use for a short period of time before a user's arms start get tired and environments that do not require a user's hands immersive interaction.

Because of limitations in weight and size, today's strap-on headsets cannot provide a wide-enough field-of-view required to provide a true immersive experience. Humans have a 270 degree field of view with eye motion. VR headsets may only achieve up to 200° with a distorted output and compromised resolution.

Full immersion projection systems may provide a virtual experience without the requirement of headsets or handheld viewers. The immersive experience on full immersive projection systems is often broken due to the visual accessibility to the real floor and real ceiling which can break the VR illusion. Furthermore, a true stereographic input for realistic perception of depth can only be achieved with dedicated video streams to each eye.

It would be desirable to create larger viewers which provide at least a wider field of view, such as a 270 degree field of view without requiring headstraps. The larger field of view would provide a user an enhanced field-of-view and resolution that would significantly enhance the immersive experience without disruption. Without headstraps, a user would not feel any additional pressures from a headset for any period of time and can be worn comfortably over a longer period of time.

The safety of the wearer may be compromised due to the constrained field-of-view (100% in VR systems, and suboptimal in augmented reality (AR) systems due to the focus on a confined window). This is especially critical in areas where workers perform maintenance work or collaborate with robots supported by AR approaches. Strapless XR viewers would be able to provide direct feedback to the user to alert a user to a dangerous situation and stop their movements through the resistance of a robot arm.

Additionally, ego motion estimation may be applied to a virtual reality system to predict a user movement due to external environment forces. For example, if a user is sitting in a car, the car movements back and forth can be eliminated as user movements. This enables joint parameter optimization of the robotic arm in such a way that a predicted user trajectory can be reached with maximized likelihood and the extended reality device may still be adapted towards the most likely future motions of the user. In free-movement implementations, ego-motion prediction helps avoid situations in which the inverse kinematics process can no longer follow the user due to the current joint parameter values.

The direct mechanical linkage between head motion and a responsive robot can also be used to compensate for "motion sickness." More accurate head tracking enables an extended reality viewing system to reduce the "motion sickness" problem. For example, motion sickness comes from the delay between the actual motion of the head and the rendered view. A part of this delay is the latency from a head tracking system. The latency from the proposed force measurement device is much lower than the latency from optical tracking devices. Using a forced measurement to determine a rendered image reduces latency as compared to using optical tracking devices to determine a rendered image, which reduces "motion sickness" and improve a user experience.

Conventional VR headsets have strict limitations on size and weight. By omitting the requirement for straps to affix a headset to a user, these limitations can be eliminated. This allows a viewer to provide a larger field of view, better image quality (higher resolution, higher contrast, etc.), and automatic ametropia compensation.

Strapless viewers require minimal hand contact and no adjustments between different users are required. Such a system could even implement an auto cleaning mechanism. These properties alleviate deployment is public spaces like public transportation and sanitary concerns, such as those during an infectious pandemic, may be mitigated.

FIG. 1 shows an example of an autonomous machine 100. Machine 100 may include one or more processors 102; one or more sensors 104; one or more effectors 114; one or more kinetic chains 116 (e.g., holding an effector); one or more propulsion devices 118; and/or one or more communication devices 120.

A sensor (also referred to as detector) may be understood as a transducer that is configured to qualitatively or quantitatively sense a property of its environment (also referred to as environmental property) corresponding to the sensor type, e.g., a geometric, kinematic, mechanical, radiometric (e.g., photometric), thermodynamically, electrical and/or chemical property. The sensed quantity is the physical quantity, to which a sensing process using the sensor is directed. Depending on the complexity of the sensor's environment to be sensed, the sensor may be configured to distinguish only between two states of the sensed quantity or to distinguish between more than two states of the sensed quantity. A sensor may be part of a specific processing chain (also referred to as sensing chain), which includes a corresponding infrastructure (e.g., including processor, storage medium and/or bus system or the like). The sensing chain may be configured to operate the corresponding sensor (e.g., water sensor, pressure sensor and/or actuation sensor), to process its sensed quantity as input and to provide a target information as output, which represents the input. One or more processors 102 (e.g., being components of a controller) may be configured to implement at least a part of the sensing chain. It is noted that the sensing chain may optionally include (e.g., wireless and/or wired) data exchange, e.g., between various nodes of a network based sensing chain. For example, the sensing chain may be configured to output the sensing result via an electrical signal (also referred to as sensor signal) or communicate the sensing to another component of the sensing chain or to a further communication device (e.g., of a further autonomous machine).

The sensing result (also referred to as sensor data) may include sensor raw data, quantized information about the sensed property (e.g., one or more values of the sensed property), or a result of processing the information about the sensed property and/or the sensor raw data. For example, the result of an image acquisition as exemplarily sensing process, may include pixel raw data, the image data based on the raw data, the result of an object recognition based on the image data, a spectral composition, a light intensity value, a distance determined based on the image data, etc. The result of the sensing process may include various types of information about an environment of the sensor, which are based on the sensing process performed by the sensor. The result of the sensing process may include information about one or more logic, geometric, kinematic, mechanical, radiometric (e.g., photometric), thermodynamically, electrical and/or chemical properties of the environment of the sensor, which are determined based on the sensing process performed by the sensor. Analogously, the type of information may be a logic type, geometric type, kinematic type, mechanical type, radiometric type (e.g., photometric type), thermodynamic type, electric type and/or chemical type.

The sensing chain (e.g., the one or more processors 102) may be configured to obtain the same sensing result by sensing various environmental properties and/or various sensors may be configured to obtain the same sensing result. For example, the sensing chain (e.g., the one or more processors 102) may be configured to determine a distance of the autonomous machine from an object based on a radar sensor, a LIDAR sensor, or also by processing image data from a camera, e.g., stereographic image data. For example, the sensing chain (e.g., the one or more processors 102) may be configured to determine a temperature based on a resistive temperature sensor or based on a radiometric sensor, e.g., based on a spectral composition that the radiometric sensor sensed.

Generally, each sensor 104 may be configured to sense an actual condition (also referred to as actual state), e.g., the condition at the point of time of the sensing process. Examples of the one or more sensors 104 may be configured to sense the actual condition of the machine 100 (also referred to as operational condition), wherein other examples of the one or more sensors 104 may be configured to sense the actual condition of the environment of the machine 100 (also referred to as environmental condition), e.g., to which the one or more sensors 104 are exposed. Examples of sensing the actual condition of the machine 100 may include: sensing the temperature of the machine 100, sensing the position of an effector, sensing the position of one or more nodes of the kinetic chain 116, sensing the position and/or orientation of the machine 100, sensing the speed of the machine, sensing an operation and/or status of the effector, e.g., sensing a force that the effector may generate, sensing a fluid flow that the effector may generate, generating an electrical power output that the effector may generate. Examples of sensing the environmental condition of the machine 100 may include: sensing an object in the vicinity of the machine 100, e.g., one or more properties of the object; sensing a progress of the task performance; sensing radiation in the vicinity of the machine 100, e.g., electromagnetic radiation or particle radiation; sensing sound/acoustics. Examples of the object may include: the workpiece that machine 100 may process, a human, another machine; a fluid, a gas, a solid. Examples of the properties of the object may include: a distance of the object from the machine; a position of the object; a temperature of the object; a texture of the object; a chemical composition of the object; a movement of the object; etc.

Examples of the one or more sensors 104 include one or more optoelectronic sensors (e.g., providing one or more image acquisition devices), one or more position sensors one or more speed sensors, one or more distance sensors, e.g., one or more radar sensors and/or one or more LIDAR sensors, one or more temperature sensors, one or more force sensors. Examples of the one or more propulsion devices 118 may include one or more ground propulsion devices 118, one or more water propulsion devices 118 and/or one or more air propulsion devices 118. Exemplary components of a propulsion device 118 may include one or more motors; one or more rollers; one or more tires; one or more continuous tracks; one or more propellers; and the like. Exemplary components of a communication device 120 may include one or more transceivers 208, 210, 212; one or more antennas (also referred to as antenna system); one or more amplifiers, one or more filters, one or more modulators, one or more demodulators, one or more baseband-processors, one or more signal processors, one or more memories.

Optionally, one or more components of the autonomous machine 100 may be configured exchangeable (also referred to as exchangeable components). The autonomous machine may be configured to unmount an exchangeable component and mount a further exchangeable component in place of the unmounted component (also referred to as self-change process). For example, at least one effector of the autonomous machine 100 may be configured to as exchangeable component. In this case, the kinetic chain 116 holding the effector may be configured to release (e.g., unmount) the effector and mount another effector (also referred to as change tools).

As outlined below in more detail, the one or more processors 102 may be configured to generate one or more messages in accordance with a communication protocol and provide the generated one or more messages to the one or more communication devices 120. The one or more communication devices 120 may be configured to send the one or more messages in accordance with a communication protocol. Analogously, the one or more communication devices 120 may be configured to receive one or more messages in accordance with a communication protocol and provide the received one or more messages to the one or more processors 102. The one or more processors 102 may be configured to process the one or more messages.

Figure 2:
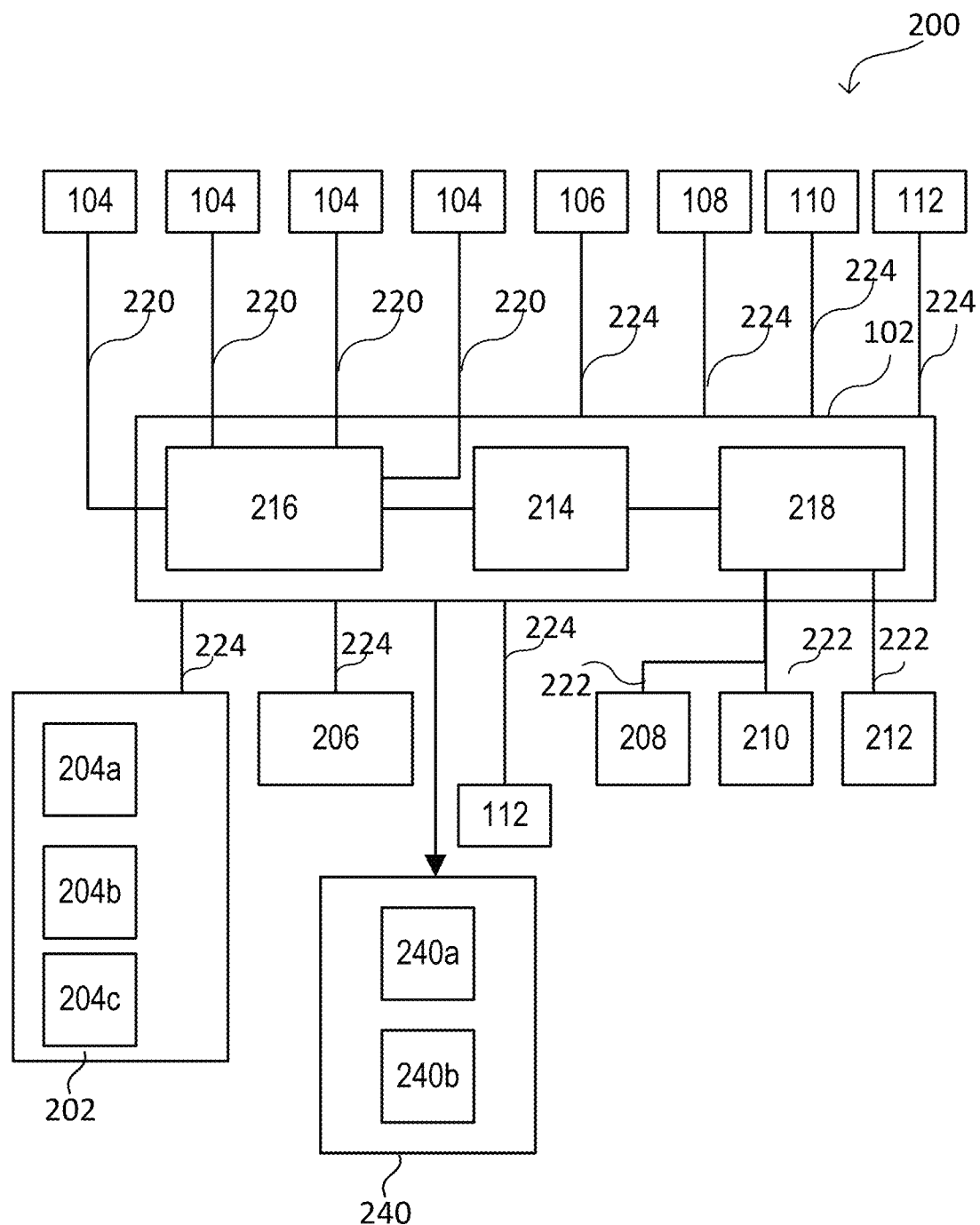
FIG. 2 shows various exemplary electronic components of a control system of the machine of the present disclosure.

Machine 100 may include a control system 200 (as described with respect to FIG. 2 below). It is appreciated that machine 100 and control system 200 are exemplary in nature and may thus be simplified for explanatory purposes. Locations of elements and relational distances (as discussed above, the figures are not to scale) are provided as examples and are not limited thereto. The control system 200 may include various components depending on the requirements of a particular implementation.

Figure 4:
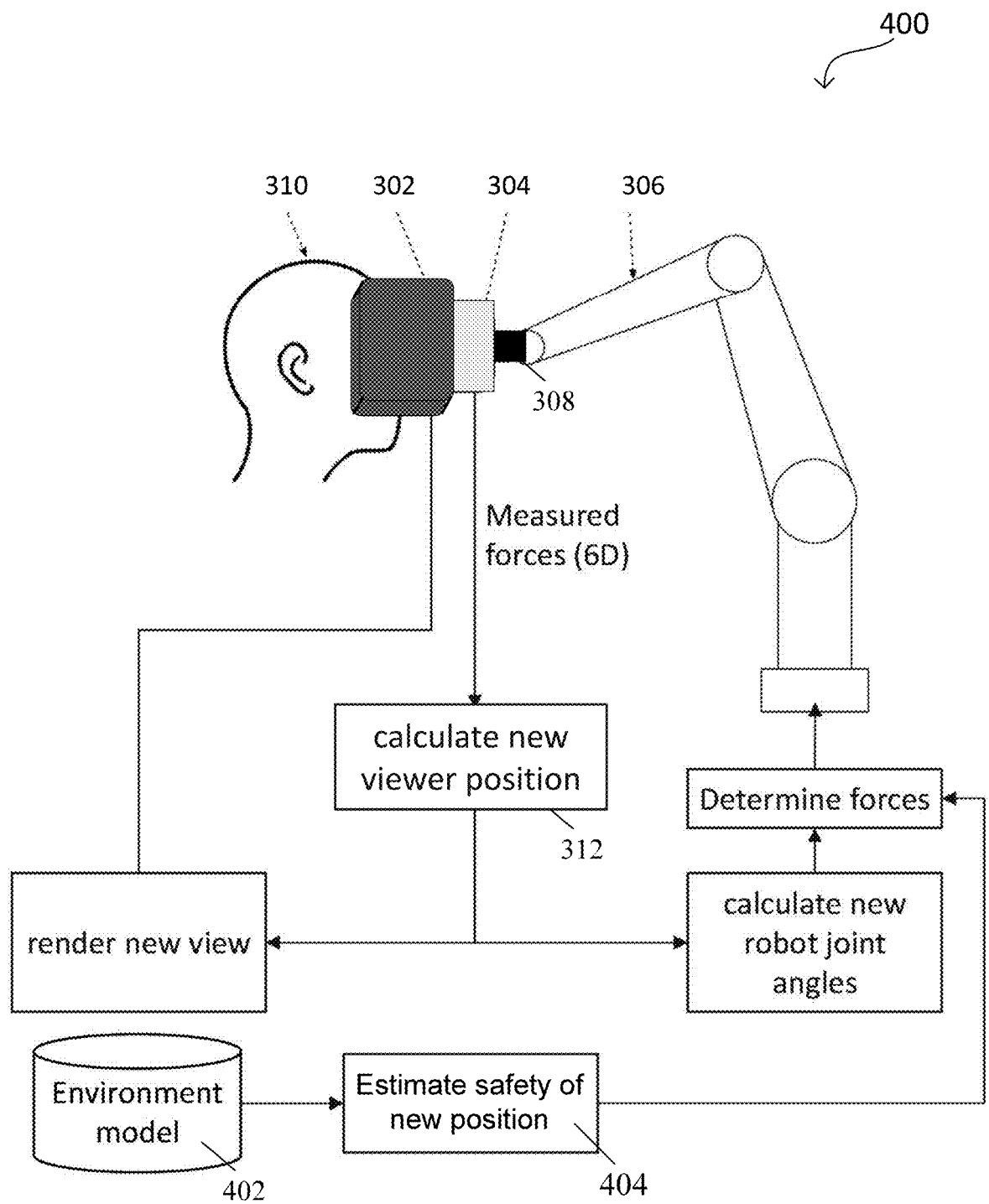
FIG. 4 shows an extended reality viewing system.

FIG. 4 shows various exemplary electronic components of a machine, namely control system 400. Control system 200 may include one or more processors 102, one or more image acquisition devices 104 (e.g., one or more cameras), one or more position sensors 106 (e.g., a Global Navigation Satellite System (GNSS), a Global Positioning System (GPS), among others) one or more distance sensors 108, e.g., one or more radar sensors and/or one or more LIDAR sensors, one or more temperature sensors 110, one or more force sensors 112. Control system 200 may further include one or more memories 202, one or more map databases 204*a*, one or more mission databases 204*b*, one or more models 204*c*, one or more input/output interfaces 206 (e.g., user interfaces), and/or one or more transceivers 208, 210, 212. Exemplary components of the one or more input/output interfaces 206 include one or more displays, one or more touch screens, one or more microphones, one or more loudspeakers, one or more buttons and/or switches, etc.

The transceivers 208, 210, 212 may be configured according to the same, different, or any combination thereof radio communication protocols or standards. By way of example, a transceiver (e.g., a first wireless transceiver 208) may be configured in accordance with a Short Range mobile radio communication standard (e.g., Bluetooth, Zigbee, among others). As another example, a transceiver (e.g., a second wireless transceiver 210) may be configured in accordance with a Medium or Wide Range mobile radio communication standard (e.g., 3G (e.g., Universal Mobile Telecommunications System—UMTS), 4G (e.g., Long Term Evolution—LTE), and/or 5G mobile radio communication standard in accordance with corresponding 3GPP ($3^{rd}$ Generation Partnership Project) standards, among others). As a further example, a transceiver (e.g., a third wireless transceiver 212) may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more transceivers 208, 210, 212 may be configured to transmit signals via the antenna system over an air interface.

One or more processors 102 may include an application processor 214, an image processor 216, a communication processor 218, a signal processor, and/or any other suitable processing device. Image acquisition device(s) 104 may include any number of image acquisition devices and components depending on the requirements of a particular application. Image acquisition devices 104 may include one or more image capture devices, e.g., cameras, CCDs (charge coupling devices, or any other type of image sensor).

Control system 200 may also include one or more data interfaces communicatively connecting the one or more processors 102 to other components of the control system 200. For example, one or more the data interfaces may be configured to exchange data in accordance with a fieldbus communication protocol or another in-machine communication protocol. For example, the one or more data interfaces may include a first data interface, e.g., including any wired and/or first link 220 or first links 220 configured to transmit image data that the one or more image acquisition devices 104 to the one or more processors 102 (e.g., to the image processor 216). For example, the one or more data interfaces may include a second data interface, e.g., including any wired and/or second link 222 or second links 222 configured to transmit radio transmitted data that the transceivers 208, 210, 212 may acquire to the one or more processors 102, e.g., to the communication processor 218. For example, the one or more data interfaces may include a third data interface 224, e.g., including any wired and/or third link 224 or third links 224, coupled to the one or more position sensor 106 and/or to the one or more distance sensors 108 and/or to the one or more temperature sensors 110 and/or to the one or more force sensors 112.

Such data transmissions may also include communications (e.g., one-way or two-way) between the machine 100 and one or more other machines in an environment of the machine 100 or even a broadcast transmission to unspecified recipients in a vicinity of the transmitting machine 100.

One or more of the transceivers 208, 210, 212 may be configured to implement the group communication protocol, and optionally one or more other communication protocols. The group communication protocol may include a proprietary communication protocol or may be a proprietary communication protocol. The group communication protocol may be an application layer protocol, e.g., defining the format, syntax, and/or semantics of the load part of a message generated in accordance with a communication protocol.

Each processor 214, 216, 218 of the one or more processors 102 may include various types of hardware-based processing devices. Exemplary components of each processor 214, 216, 218 may include: a microprocessor, pre-processors (such as an image pre-processor), graphics processors, a central processing unit (CPU), support circuits, digital signal processors, integrated circuits, memory, or any other types of devices suitable for running applications and for sensor data processing and analysis. Each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when a processor (e.g., the one or more processors 102) executes, controls the operation of the system, e.g., of the control system 200. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

Control system 200 may further include components such as a speed sensor (e.g., a speedometer) for measuring a speed of the machine 100. The control system may also include one or more accelerometers (either single axis or multiaxis) (not shown) for measuring accelerations of the machine 100 along one or more axes. The control system 200 may further include additional sensors or different sensor types such as an ultrasonic sensor, a thermal sensor, one or more radar sensors 110, one or more LIDAR sensors 112 (which may be integrated in the head lamps of the machine 100), and the like.

The one or more memories 202 may store data, e.g., in a database or in any different format. The one or more processors 102 may be configured to process sensory information (also referred to as sensor data), such as images, radar signals, depth information from LIDAR, temperature values or stereo processing of two or more images) of the environment of the machine 100 together with position information, such as a GPS coordinate, a machine's ego-motion, etc., to determine a current location of the machine 100 relative to the known landmarks, and refine the determination of the machine's location. This technology may be included in a localization technology such as a mapping and routing model.

The map database 204 may include any type of database storing (digital) map data for the machine 100, e.g., for the control system 200. The map database 204 may include data relating to the position, in a reference coordinate system, of various items, including roads, buildings, walls, topographic features (e.g., stairs), geographic features, rooms, points of interest, spatial information of a task, docks, etc. A processor of the one or more processors 102 may download (e.g., some or all) information of the map database 204 over a wired or wireless data connection to a communication network (e.g., over a cellular network and/or the Internet, etc.). A processor of the one or more processors 102 may be configured to determine, e.g., form and/or update, (e.g., some or all) information of the map database 204, e.g., based on sensing the environmental condition by the one or more sensors 104. Map database 204 may store a sparse data model including polynomial representations of the environment of the machine 100.

Control system 200 may include a mission database. Exemplary components of the mission database may include mission data, a task list, a task status, a task allocation, achievement parameters, target results, etc. Illustratively, the mission database may provide and/or store information about a mission of the team, to which the machine 100 is affiliated. Some information of the mission database (e.g., some mission data) may be provided to the machine 100, e.g., one or more other members of the team and/or a central mission controlling authority may provide the information of the mission database. The machine 100 may provide some information of the mission database (e.g., some mission data), e.g., to one or more other members of the team and/or to a central mission controlling authority. The machine 100 may update and/or form some information of the mission database (e.g., some mission data), e.g., in accordance with a status of the mission and/or based on a sensing result of the machine 100.

Furthermore, the control system 200 may include a task performance model 204b, e.g., an automated system may implement the task performance model 204b. By way of example, the control system 200 may include (e.g., as part of the task performance model) a computer implementation of a formal model of the machine or its environment. By way of example, the control system 200 may include (e.g., as part of the task performance model) a safety performance model, a task interpretation model and/or a machine control model. A task performance model may be or include a mathematical model formalizing an interpretation of applicable task performance policies, safety policies, operation policies, mission data, etc., e.g., being applicable to autonomous machines. It is noted that one or more of the detailed components of the task performance model may be implemented monolithically or separately from each other, e.g., by separate applications that the one or more processors may execute.

For example, the safety performance model may be configured to achieve, e.g., three goals: first, the interpretation of safety policies should be sound in the sense that it complies with how humans interpret the safety policies; second, the interpretation should lead to a useful task performance, meaning it will lead to an agile task performance rather than an overly-defensive task performance which inevitably would confuse other agents (e.g., humans and/or machines) and will obstruct accomplishing the mission and in turn limit the scalability of system deployment; and third, the interpretation should be efficiently verifiable in the sense that it can be rigorously proven that the autonomous machine correctly implements the interpretation of the safety policies. The safety performance model, illustratively, may be or include a mathematical model for safety assurance that enables identification and performance of proper responses to dangerous situations such that self-perpetrated accidents can be avoided.

For example, the task interpretation model may be configured to determine a formal formulation of performance steps the machine may perform, e.g., based on information about one or more tasks of the mission allocated to the machine and/or based on the target performance. The conversion may be configured to lead to an efficient task performance and to a result, which meets the target performance as best as possible, e.g., to accomplish the task.

For example, the machine control model may be configured to determine useful actions that the machine may take leading to a useful task performance, e.g., based on the performance steps and/or the model of the machine and/or its environment. For example, the machine control model may generate the control instructions based on a model of the kinetic chain of the machine, the available effectors of the machine, the reachable position of the machine, etc.

The control system 200 may generate data to control or assist to control the engine control unit (ECU) and/or other components of the machine 100 to directly or indirectly control the driving of the machine 100.

Control system 200 may include a driving device 240 configured to drive one or more actuators of the autonomous machine, e.g., one or more actuators of the kinematic chain of the autonomous machine 100 and/or one or more actuators of the one or more propulsion devices 118. For example, the driving device 240 may include one or more amplifiers 240a and/or one or more energy storages 240b. Examples of energy storages 240b may include any storage capable to storing energy (in a certain form, e.g., such as electrically, magnetically, chemically, and the like) and convert the stored energy in electrical power. Examples of the amplifiers 240a may include any voltage-to-voltage converter providing an operation voltage of the one or more actuators based on the electrical supply power and based on a control signal received from the one or more processors 102.

As described above, the machine 100 may include the control system 200 as also described with reference to FIG. 2.

The machine 100 may include the one or more processors 102 e.g., integrated with or separate from an engine control unit (ECU) of the machine 100.

The control system 200 may in general generate data to control or assist to control the ECU and/or other components of the machine 100 to directly or indirectly control the driving of the machine 100.

Although the following will be described in association with the above detailed models, any other model may be provided in alternative implementations.

Figure 3:
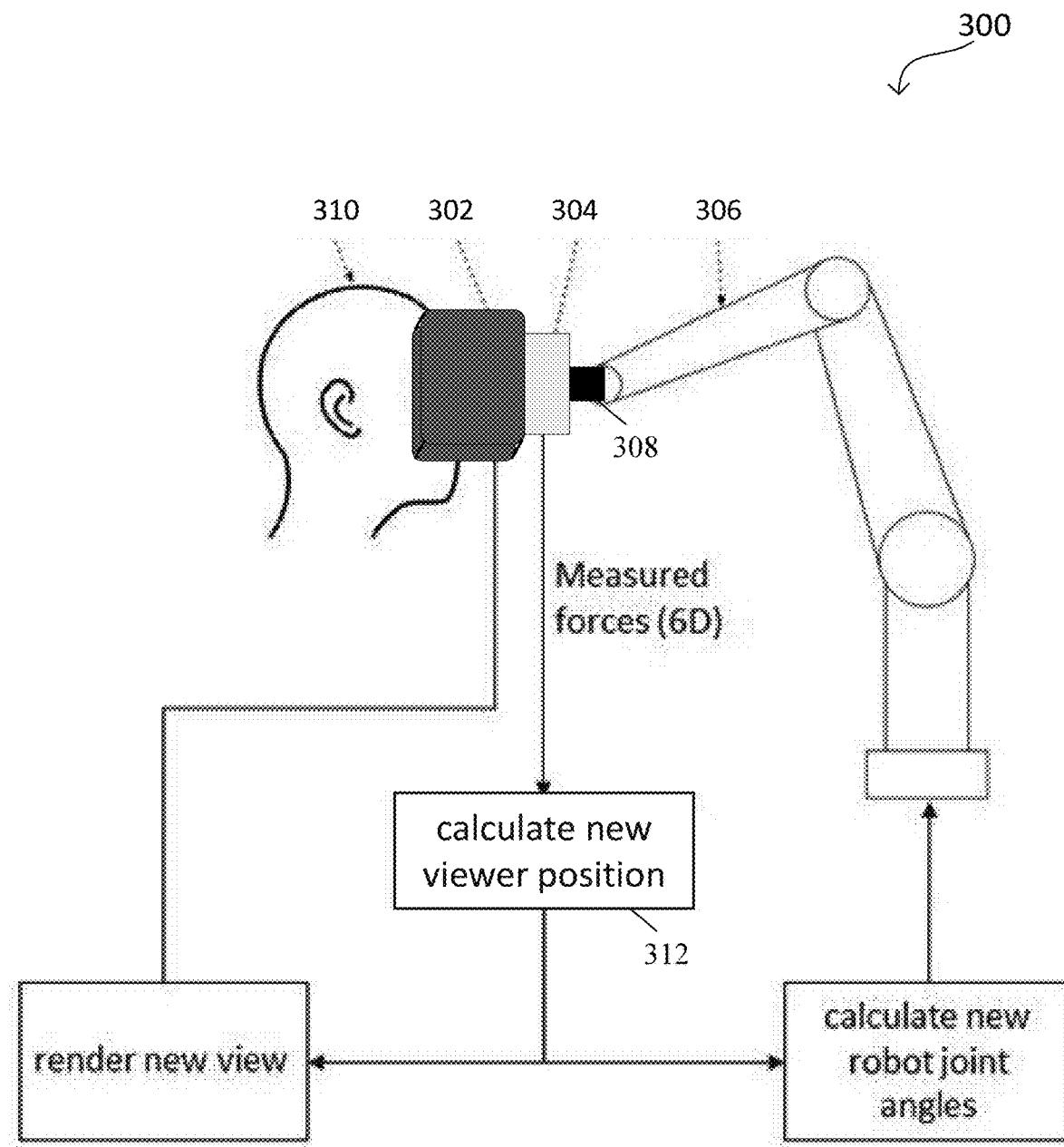
FIG. 3 shows an extended reality viewing system.

FIG. 3 shows a strapless extended reality (XR) viewing system 300. XR viewing system 300 may include an XR viewer 302, at least one sensor 304, and a robotic arm 306. The XR viewer may include a display (not shown). XR viewer 302 may be configured to fit around the head of user 310 so that user 310 may view the display. XR viewer 302 and/or sensors 304 may be physically connected to robotic arm 306 via a connection 308. Sensors 304 could be mounted statically on robotic arm 306, or even inside viewer 302. Sensors 304 may measure a force from user 310. Based on the measured force, processors 312 may calculate a new position and control the robotic arm 306 to move the viewer 302 into the new position. For example, it may calculate new robot joint angles. Additionally, processors 312 may calculate a new image to display and control viewer 302 to display or render to the new image. The movement of robotic arm 306 may also be dependent on the content displayed on the display of XR viewer 302.

FIG. 4 shows a strapless XR viewing system 400. XR viewing system 400 may be an extension of XR viewing system 300 which may include environment model 402. Environment model 402 may include a map of a user environment. Processors 404 may user environment model 402 to determine a safety of the new position. Controlling the robotic may be determined on the safety determination as well as the measured forces.

Mounting XR viewer 302 on robotic arm 306 may keep the viewer 302 in an optimal position which follows the motions of user 310. XR viewing systems 300 and 400 may use active compliant motion control to keep viewer 302 in its optimal position. Sensors 304 may include a load sensor configured to measure forces in 6 degrees. Sensors 304 may be inserted between viewer 302 and robotic arm 306 to measure forces and torques as input for controlling robotic arm 306. Robotic controls of robotic arm 306 may follow a robotic control scheme, such as position control, speed control, and/or force control schemes. Alternatively, or additionally, sensors 304 may constantly measure the force, or pressure, applied between viewer 302 and the face of user 310 (contact points/line/spaces). As a result, viewer 302 appears to be weightless to user 310 and follows user's 310 motions by pertaining a minimal contact force between user's 310 head and viewer 302. Other possible implementations could use contactless tracking of user's 310 head using optical or ultra-sonic systems.

Furthermore, to enhance the user's 310 safety, XR viewing system 400 may apply a resistance force applied from viewer 302 to user 310, in case the wearer is attempting an unsafe movement (e.g. if his head would collide by moving forward).

The force applied by robot arm 306 is set to achieve two objectives. First, to ensure that XR viewer 302 has a "snug-fit" over user's 310 head at each user position. Second, to provide protective feedback meant to resist unsafe movements of user 310, described in further detail with respect to FIG. 5.

Force detection, through load sensors 304, may be a 6D force measurement system. "Active compliant motion control" is an already existing robot control strategy. Normally it is used in Cobot applications, where the robot relieves a worker from the weight of an object to handle. The robotic arm 306 only moves according to forces applied by the user 310, giving user 310 the feeling of zero gravity. Here, XR viewing system 300 or 400 does not use active compliant motion control to make an object weightless, but to make XR viewer 302 "hover" in front of user 310 while applying a minimal pressure against the face for a snug fit. As the position of the XR viewer 302 is not tracked, but actively set, there is virtually no latency (the force control loop can run at 1000 Hz) or offset between the viewing direction and the rendered scene (e.g., image, rendered content), drastically improving the experience, and reducing motion sickness. The pure force-control is improved by motion prediction where possible, i.e., in the case of using the system in a vehicle, described in further detail with respect to FIGS. 9 and 10.

Figure 5:
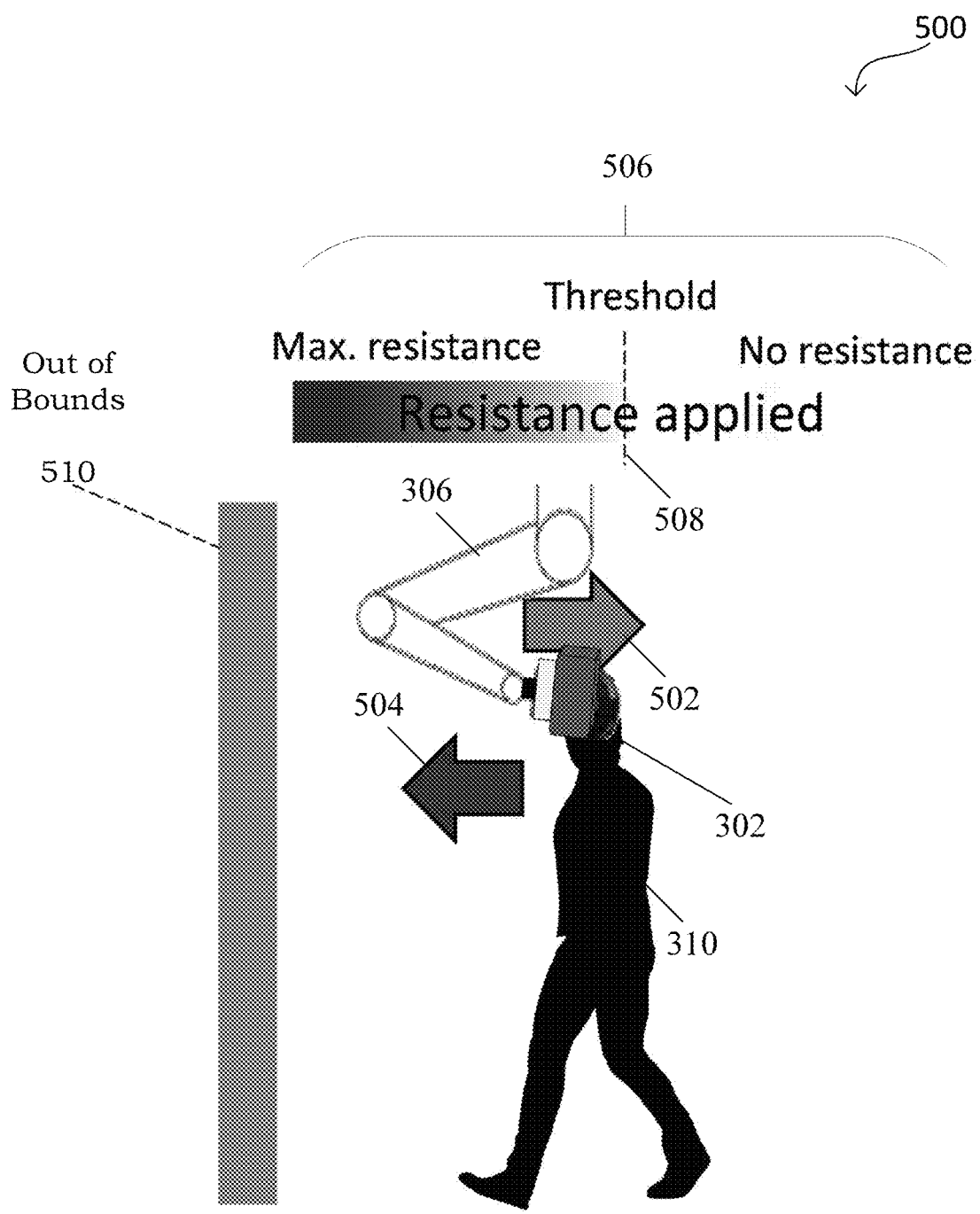
FIG. 5 shows an extended reality viewing system configured to apply a resistance force.

FIG. 5 shows a scenario where user 310 may approach an unsafe position. For example, if user 310 approaches a wall or obstacle 510, robotic arm 306 may apply a resistance force 502 in an opposite direction as compared to user force 504. XR viewing system 500 may include threshold distance 508. As user 310 approaches obstacle 510, user may cross threshold distance 508. As user 310 crosses threshold 508, robotic arm 306 may apply resistance force against user 310 to ensure that user 310 does not run into the wall. The magnitude of resistance force 502 may be correlated to a distance between user 310 and out-of-bounds zone or obstacle 510. For example, XR viewing system may include a resistance force range 506. Resistance force range 506 may include instructions to apply a force based on a distance between user 310 and obstacle 510. For example, before a user reaches the threshold 508, there may be no resistance force 502. Once user 310 reaches threshold 508, robotic arm 306 may apply a resistance force 502 less than user force 504. This allows user 310 to continue toward obstacle 510. As user 310 gets closer to obstacle 510, resistance force 502 increases. Resistance force 502 may increase to a magnitude equal to user force 504 to stop user. Resistance force 502 may increase to a magnitude greater than user force 504 to push use 310 back. Additionally, XR viewer 302 may be configured to wrap around user 310 head. A wrap around viewer 302 may be able to apply a resistance force 502 in directions other than opposite user force 504. For example, if it is safe for a user to move left from the direction of travel, but not safe to move forward, robotic arm 306 may apply a force in a left direction relative from the direction of user's 310 travel. A wrap around viewer 302 will then apply the pressure to user's 310 head and alert user 310 that they should move left to stay safe.

Resistance force 502 may be based on an environment model 402, generated from state-of-the-art mapping techniques, to determine unsafe areas and load sensor 304 measurement of user force 504 on XR viewer 302. XR viewing system 500 may use a compliant motion control scheme based sensor 304 measurements. Additional inputs may include display content, user movement predictions, and vehicle movement predictions.

A computation to predict the position of user 310 according to his current applied forces measured at load sensor 304 may be compared against the environmental model 402 to check for collisions. If a collision is close, as defined by threshold 508, the resistance force 502 is activated to warn user 310 about an obstacle. This force 502 may be constant or distance-dependent.

Additionally, the robot's kinematic and dynamic limitations are considered. If user 310 motion prediction shows a high likelihood that the user 310 will leave the maximum kinematic range of XR viewer 302 mounted on robotic arm 306, the XR viewing system can slow down motion and gently push back instead of suddenly stopping when reaching the kinematic limit.

Alternatively, user's 310 force measurement 504 could be replaced by some contactless tracking technology, holding viewer 302 at a low distance away from user 310. For example, camera based tracking of the head—with or without artificial markers—could be used.

In yet another example, the display in XR viewer 302 may display an alert or XR viewer 302 may include speakers to audibly alert a user to an obstacle.

A single robotic arm 306 may be sufficient to follow user movement in a confined space. A single lightweight arm like a "Universal Robot (UR)" could be easily mounted to the ceiling of a living room just above a seating area, in public transportation, entertainment locations, and working benches. For example, user 310 sitting down in a chair, and having XR viewer 302 come down from the ceiling and "hover" before user's 310 eyes.

Figure 6:
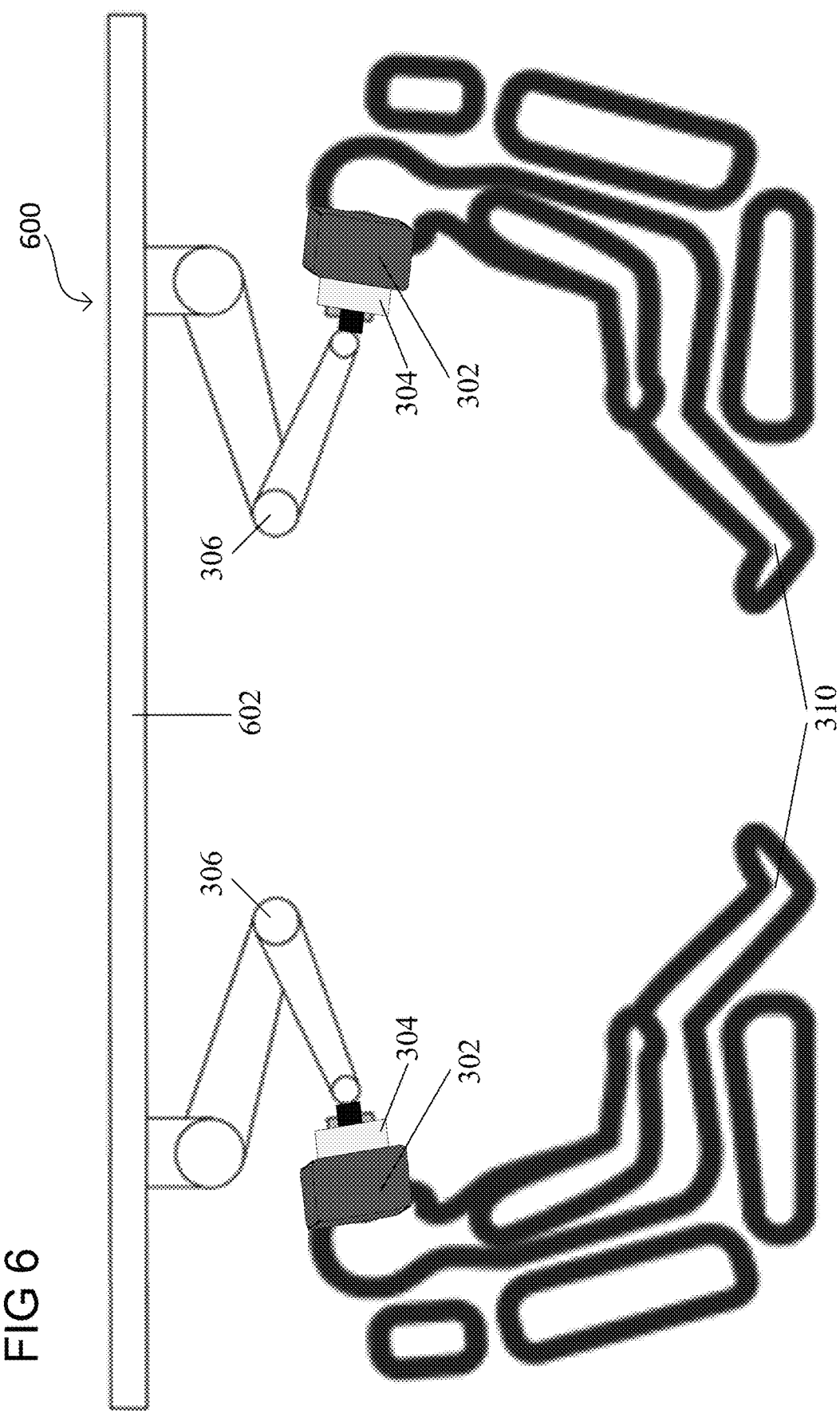
FIG. 6 shows an extended reality viewing system.

FIG. 6 shows an XR viewing system deployed in a moving vehicle environment 600. Vehicle environment 600 may include seats for users 310. The viewing system may be deployed in vehicle environment 600 may be XR viewing system 300 or 400 or any other XR strapless viewing system. Robotic arms 306 may be mounted to an overhead receiving device 602. Receiving device 602 may include self-cleaning compartments (not shown). Robot arms 306 may position XR viewer 302 in self-cleaning compartments between use so that display viewers 302 may be sanitized in between uses.

The configuration of FIG. 6 setup works especially well, if the motion space of the users 310 is confined. This may apply to many environments with seats. For example, at a desk, in a comfy chair, or in the interior of a vehicle. After user 310 enters an XR space such as vehicle environment 600, XR viewers 302 may lower themselves automatically from the receiving device 602 (i.e., roof), and enable user 310 to experience an XR or VR environment without the hassle of putting on a headset. This would allow a completely new experience of VR or AR in-vehicle infotainment.

In public transportation, where a viewer is used by a different person every time, this disclosure avoids any user specific adaptions to the head size. This may increase acceptance of VR entertainment in static and mobile environments such as in autonomous driving vehicles.

As previously stated, self cleaning compartments may santize XR viewer 302. In robo-taxi scenarios, the strapless XR viewer 302 would allow users to enjoy a VR experience with minimal contact as no hands are needed to wear viewer 302. This lowers the acceptance threshold due to sanitary concerns. Furthermore, viewer 302 can easily be disinfected automatically while retracted into the overhead compartment.

The space of operation could be extended to a larger area by enabling the displacement of robotic arm 306 by mounting robotic arm 306 to a linear axes under the ceiling or to an AMR that follows the movements of the person as described in further detail below.

Figure 7:
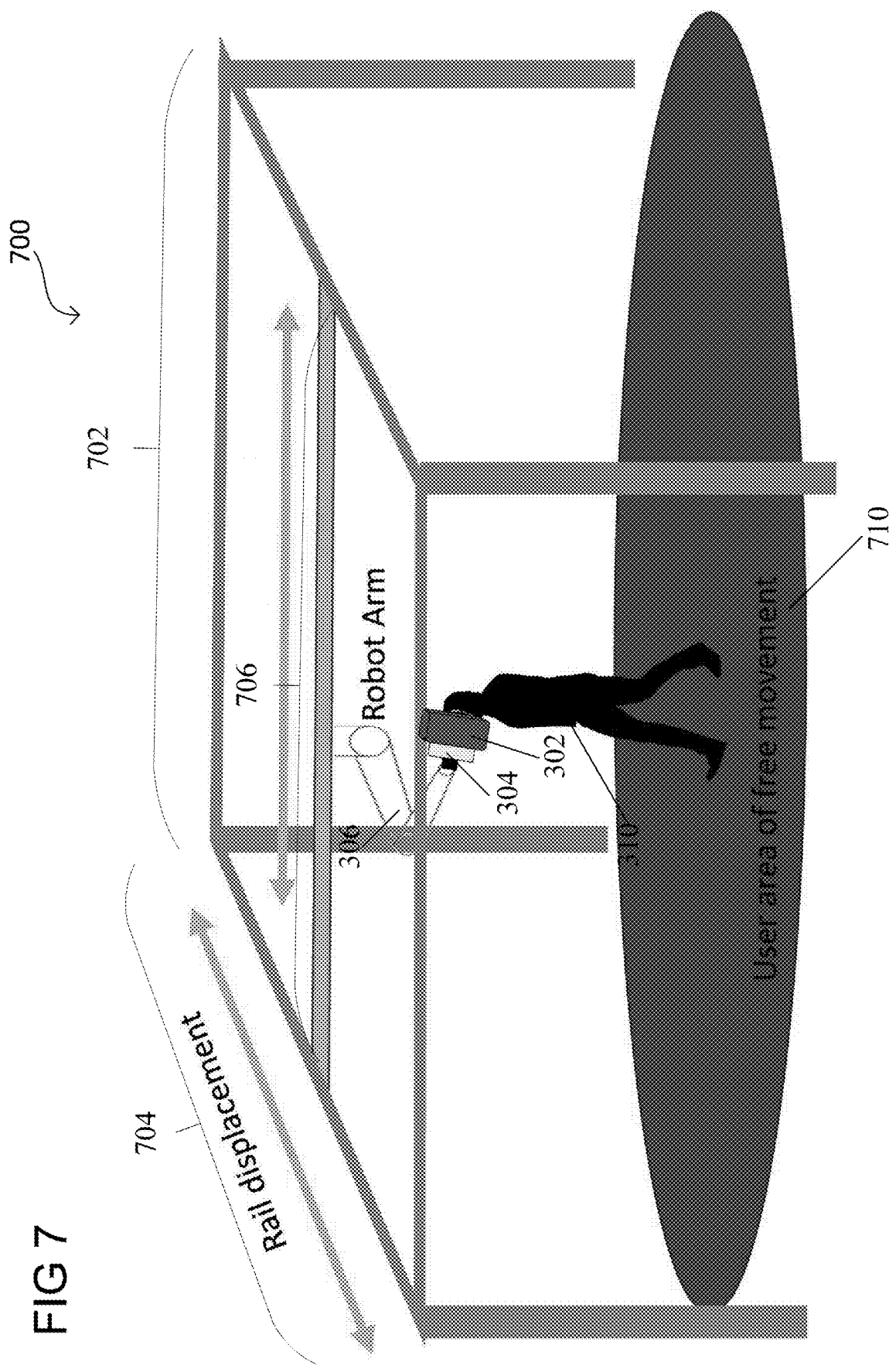
FIG. 7 shows an extended reality viewing system including a rail system.

FIG. 7 shows an XR viewing system 700. XR viewing system 700 may include rail system 702. Rail system 702 may be a free standing structure as shown in FIG. 7. Alternatively, Rail system 702 may be mounted on a ceiling or any other configuration suitable for an XR viewing system. Robotic arm 306 may be mounted to rail 706 of rail system 702. Robotic arm 306 may be controlled to move along rail 706 to reach at least the length of free movement area 710. Alternatively, rail system 702 may be controlled to move robotic arm 306 along rail 706. The length of robotic arm 306 may extend to at least the width 704 of free movement area 710. As user 310 moves around free movement area 710, sensors 304 may measure a force user 310 applies to XR viewer 302. Based on the measured force, processors 312 (not shown) may generate control instructions to move robotic arm 306 along rail system 702 and move XR viewer 302 into a new position. Additionally, processors 312 may control robotic arm 306 to move XR viewer 302 with 6D of freedom.

Rail system 702 may include more than one rail 706. Multiple rails 706 may for a grid or any other pattern on which robotic arm 306 may move.

Figure 10:
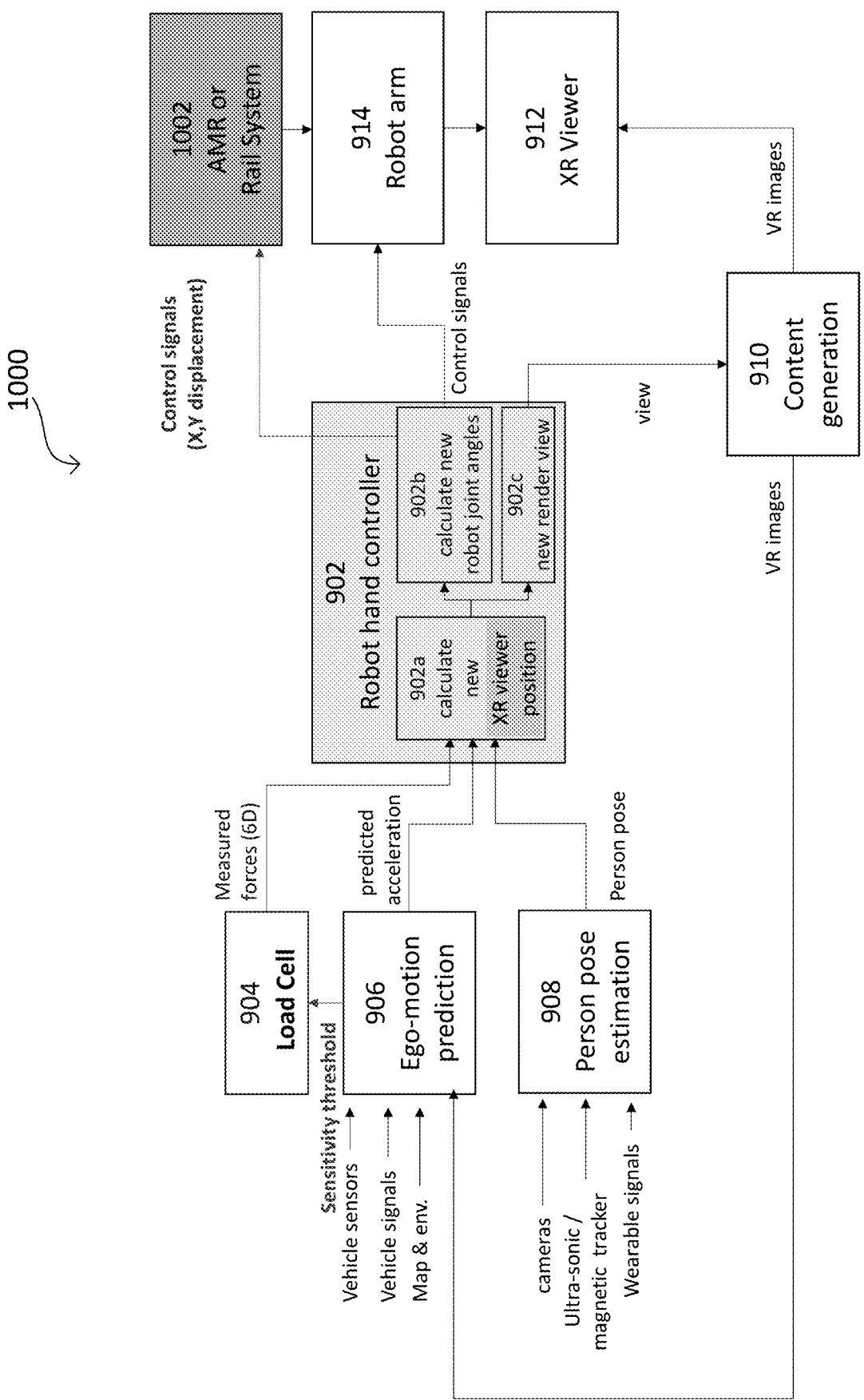
FIG. 10 shows a flow chart for an extended reality viewing system.

Installation of a 2D rail system 702 in the ceiling may require a minimum extension to the control mechanism to add 2 extra degrees of freedom, described in further detail with respect to FIG. 10. In addition, a physical installation of a rail system 702 is needed and thus is suitable for environments that can be physically adapted.

Figure 8:
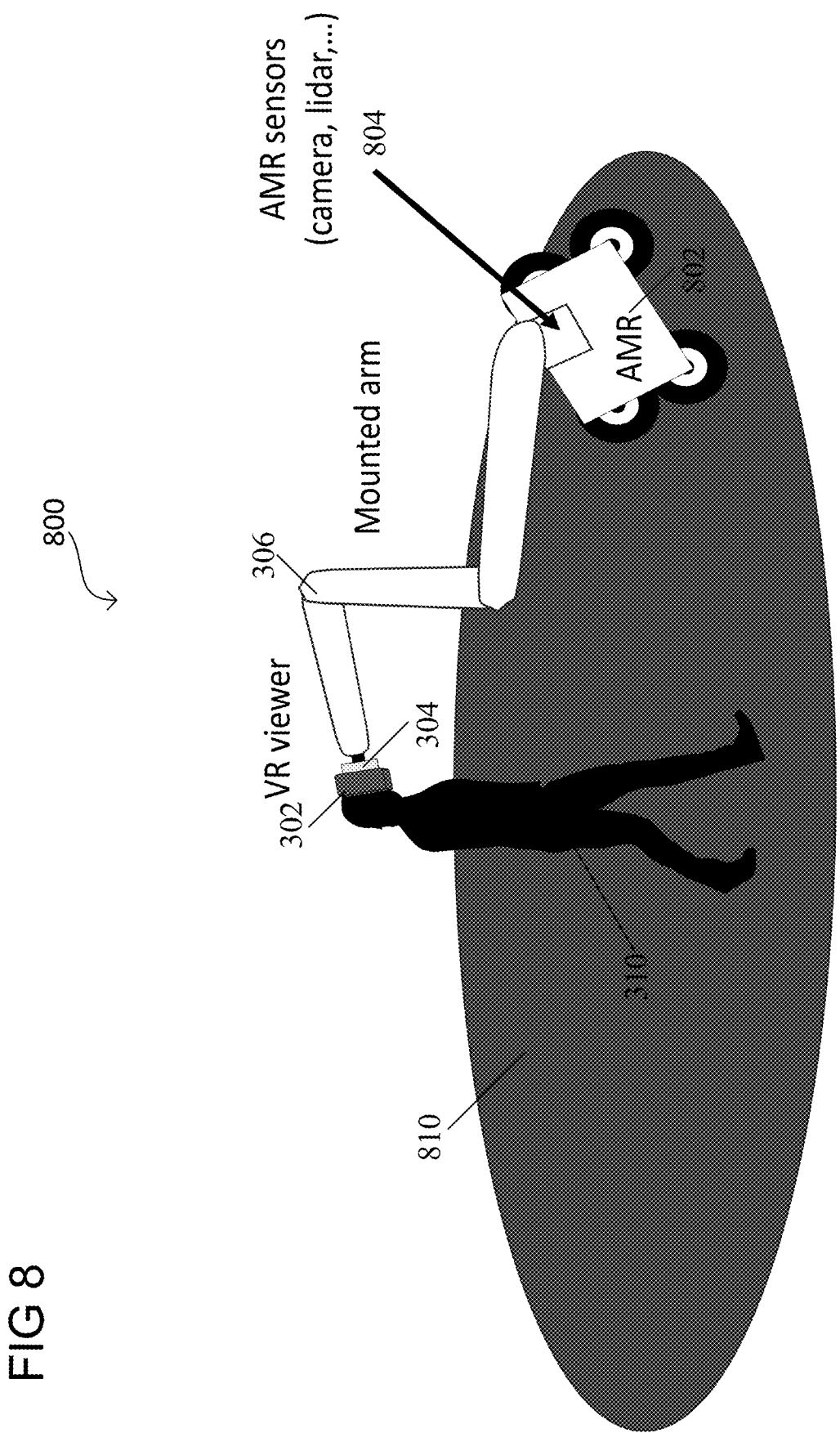
FIG. 8 shows an extended reality viewing system including an autonomous mobile robot (AMR).

FIG. 8 shows an XR viewing system 800. XR viewing system 800 may include AMR 802. AMR 802 may include one or more sensors 804. AMR 802 may move based on measurements from sensors 804. Additionally, XR viewing system 800 may control AMR 802 may be based on measurements from sensors 304, which measure a force on XR viewer 302. Robotic arm 306 may be mounted to AMR 802. As user 310 moves around free movement area 810, user 310 may generate forces against XR viewer 302. Sensors 304 may measure the user generated force and generate a control instruction for robotic arm 306. The control instructions may include a movement instruction for robotic arm 306 and AMR 802. XR viewing system 800 may determine a visual image to display on a display of XR viewer 302 based on a movement of robotic arm 306 and AMR 802. The movement of arm 306 and AMR 802 are in turn based on the forces applied to XR viewer 302 and the measurements of sensors 304. Mounting robotic arm 306 to an AMR 802 allows user 310 to have a free-moving environment where AMR 802 follows user's 310 displacements.

AMR 802 may include sensors to allow its safe movement in the environment 810 as well as to track the movement of user 310. The control algorithm is again extended by two extra degrees of freedom. If AMR 802 may extend up and down, the control algorithm may be extended by three extra degrees of freedom.

In both FIGS. 7 and 8, the system may provide user 310 notification when the robotic arm 306 will not be able to follow user 310 due to physical constraints, such as leaving the operating area, or potential physical collisions. The protective feedback force described with respect to FIG. 5 is adequate for scenarios in which user 310 will still be capable to move his head even though the robotic arm 306 is providing resistance through XR viewer 302. In such cases, user 310 may move his head to one side, and "decouple" from the viewer.

For scenarios where safety should be enforced more strictly, a mechanism may provide better feedback from the XR viewer 302 to user 310. Such feedback may include movement in all three directions. This can be implemented through the use of a viewer 302 which encircles a user's 310 head, or a user interface that is able to have physical contact to the sides and top of the wearer.

Provided the mechanism chosen is well adjusted, i.e., there is no loose movement, the existing load cell 304 will be capable to perceive the movements at a wider range and the robot arm 306 will be able to constrain those movements more effectively.

FIGS. 7 and 8 describe free movement scenarios. User 310 may move freely within an area of free movement. Other scenarios may provide users 310 a free movement environment and be controlled be an XR viewing system.

Figure 9:
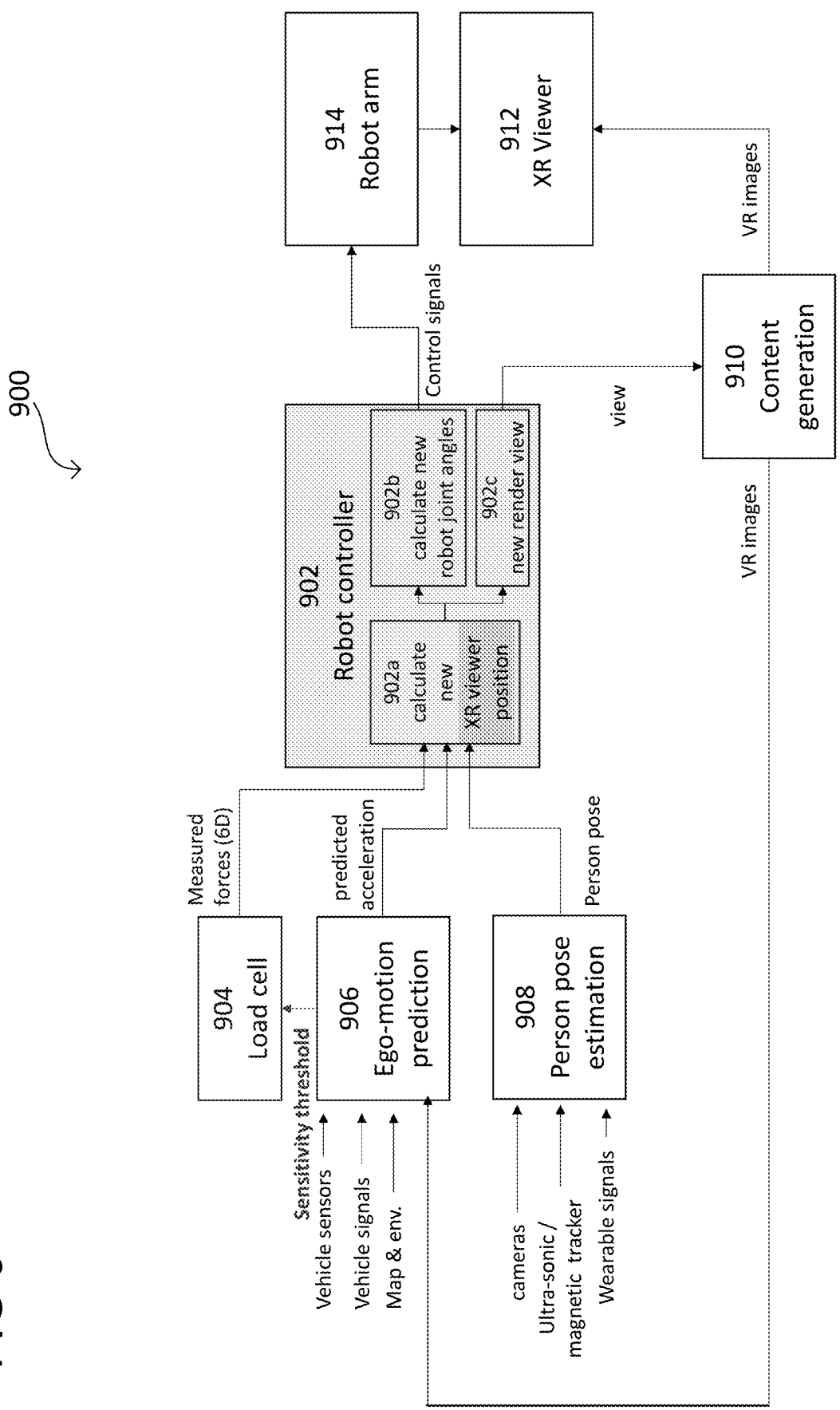
FIG. 9 shows a flow chart for an extended reality viewing system.

FIG. 9 shows an ego motion flowchart 900 to extend a robotic arm control. Flowchart 900 may include robot controlling module 902. Robot controlling module 902 may receive input from load sensor 904, ego motion prediction module 906, and user position estimation module 908. Load sensor 904 may measure the forces on XR 912 and transmit them to robot controlling module 902. Ego motion prediction module 906 may receive vehicle sensor data, vehicle signal, an environment map, and XR viewer display images as input. Based on its received input, ego motion prediction module 906 may generate a predicted acceleration and transmit it to robot controlling module 902. User position prediction module 908 may receive image data, motion tracking data, and signals from user wearable devices. Based on its received input, user position prediction module 908 may generate a predicted user position and transmit it to robot controlling module 902. It should be noted that ego motion prediction module 906 and user position prediction module 908 may receive other input data not listed to generate output.

Robot controlling module 902 may initiate subroutine 902a to determine a new XR viewer 912 position based on the input from load sensor 904, motion prediction module 906, and user position estimation module 908. Subroutine 902a may transmit the new XR viewer position to robot position subroutine 902b and view renderer subroutine 902c. Based on the new XR viewer position, subroutine 902b may determine to robotic arm joint angles or robotic arm movement. Based on the new XR viewer position, subroutine 902c may determine a new view to display.

Subroutine 902b may generate control signals based on the determined robot join angles. Subroutine 902b may transmit the control signals to robotic arm 914. The control signals control robotic arm 914 to move and position XR viewer 912 in the new XR viewer position determined in subroutine 902a.

Subroutine 902c may generate view information to content generation module 910. Content generation module 910 may generate images based on the received view information. Content generation module 910 may transmit the generated images to ego prediction module 906 and XR viewer 912. XR viewer 912 may include a display to display the received images.

With ego motion extension as described in flowchart 900, XR viewer 912 acceleration may be adjusted to match the acceleration of the user (e.g. when forced by a vehicle's motion) with no latency (i.e. the viewer is not felt to become heavier).

FIG. 10 shows an ego motion flowchart 1000 to further extend a robotic arm control. Flowchart 1000 may include the same components as flowchart 900 of FIG. 9. In addition, subroutine 902b may be configured to generate control signals for a rail system or AMR as described in FIGS. 7 and 8, respectively. Subroutine 902b may be configured to generate control signals for any other device included in an XR viewing system. For example, if robotic arm 914 is mounted to a device other than a rail system or AMR, Subroutine 902b may be configured to control the other device as well. Subroutine 902b may generate control signals to control movement in a 2 dimensional plane. For example, robotic arm 914 may be mounted to a ceiling rail system. The control signal may control the rail system 1002 to move robotic arm 914 to specified coordinates on an XY grid of rail system 1002. As another example, robotic arm 914 may be mounted to an AMR. The control signal may control the AMR 1002 to move along a floor and move robotic arm 914 to specified coordinates on the floor. It should be noted that the control signals generated for AMR or rail system 1002 are not limited to two dimensions. For example, AMR 1002 may have some elevation capabilities and the control signals may include instructions to move the AMR up or down.

The ego-motion extensions described in FIGS. 9 and 10 provide an acceptable experience in mobile environments, such as those where user 310 may move freely. Robotic arm 306 may automatically compensate for expected acceleration of user 310. For example, a person in a vehicle may move due to turns, hills, bumps, breaks, etc. This is achieved by leveraging environmental information such as known maps and topology of the road, detected objects in the road, as well as signals from the vehicle, such as a signal from the vehicle indicating breaking.

This removes the perceived extra weight of the XR viewer 302 due to inertia. The proposed use of a robotic arm 306 to support XR viewer 302 enables and XR viewing system to preemptively adjust the forces sustaining the viewer 302 due to the acceleration of a vehicle. Without this solution, the inertia of the viewer 302 in a turn will be a significant burden to a user's neck muscles.

In a VR environment, the content images displayed in XR viewer 302 may also be used for ego-motion prediction. If, for example, the VR software is a car racing game, and the next turn is a left turn, the person can be expected to turn the head towards left. Robotic arm 306 control adapts its sensitivity to the head movement of user 310 to react more quickly to an expected movement.

Figure 11:
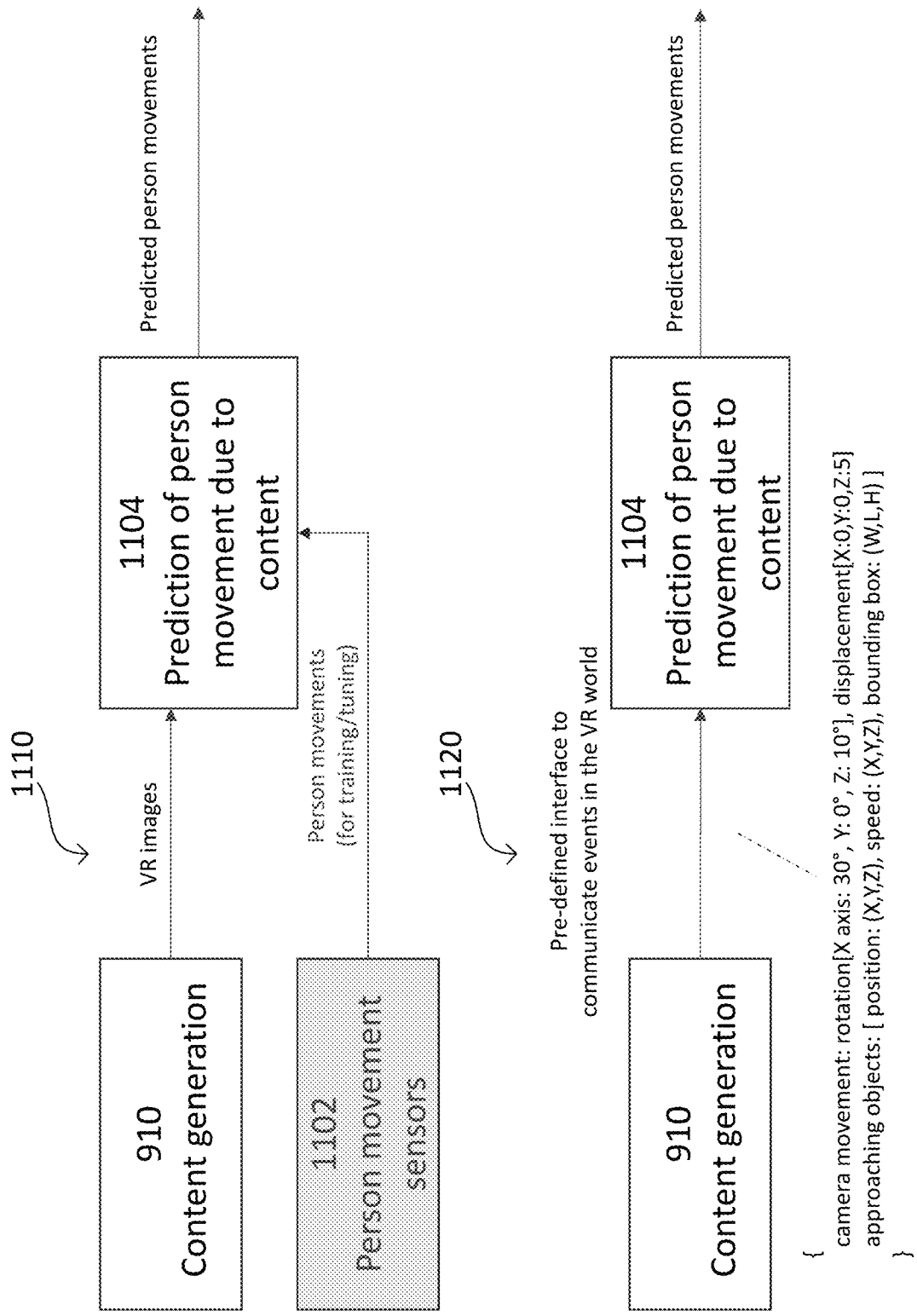
FIG. 11 shows a flow chart for ego-motion prediction.

FIG. 11 shows flow charts 1110 and 1120 to predict ego motion from content images. Charts 1110 and 1120 may include prediction module 1104 to predict the ego motion from the XR content. For example, prediction model 1104 may receive images, such as VR images, from content generation model 910.

Prediction module 1104 may include a general runtime learning system that learns the correlations between images and a user movement through reinforcement learning. A user may also have wearable device 1102. Wearable device 1102 may include sensors to measure user movements and transmit the measurements to module 1104. Wearable device 1102 may also include user 310 specific information. For example, when user 310 is in close proximity to XR viewer 302, wearable device 1102 may transmit user physical information such as height, and historical data about a specific user's movements. This information may be transmitted to person position estimation module 908 to better predict a user's movement.

Alternatively, prediction module 1104 may include an offline rule-based model or a supervised data-based model. The rule-based or supervised data-based models may estimate the expected movement in a virtual environment. For example, a turn to the left in a racing game, or ducking when an object is approaching a user's head.

Flow chart 1110 may use existing interfaces between prediction module 1104 and content generation process 910.

Flow chart 1120 may define an interface between module 1104 and content generation module 910. The interface may allow content generation module 910 to indicate the next events in the virtual world. Content generation module 910 may provide this information to prediction module 1104. Prediction module 1104 may predict a user movement based on the next events in the virtual world and/or raw image data.

Figure 12:
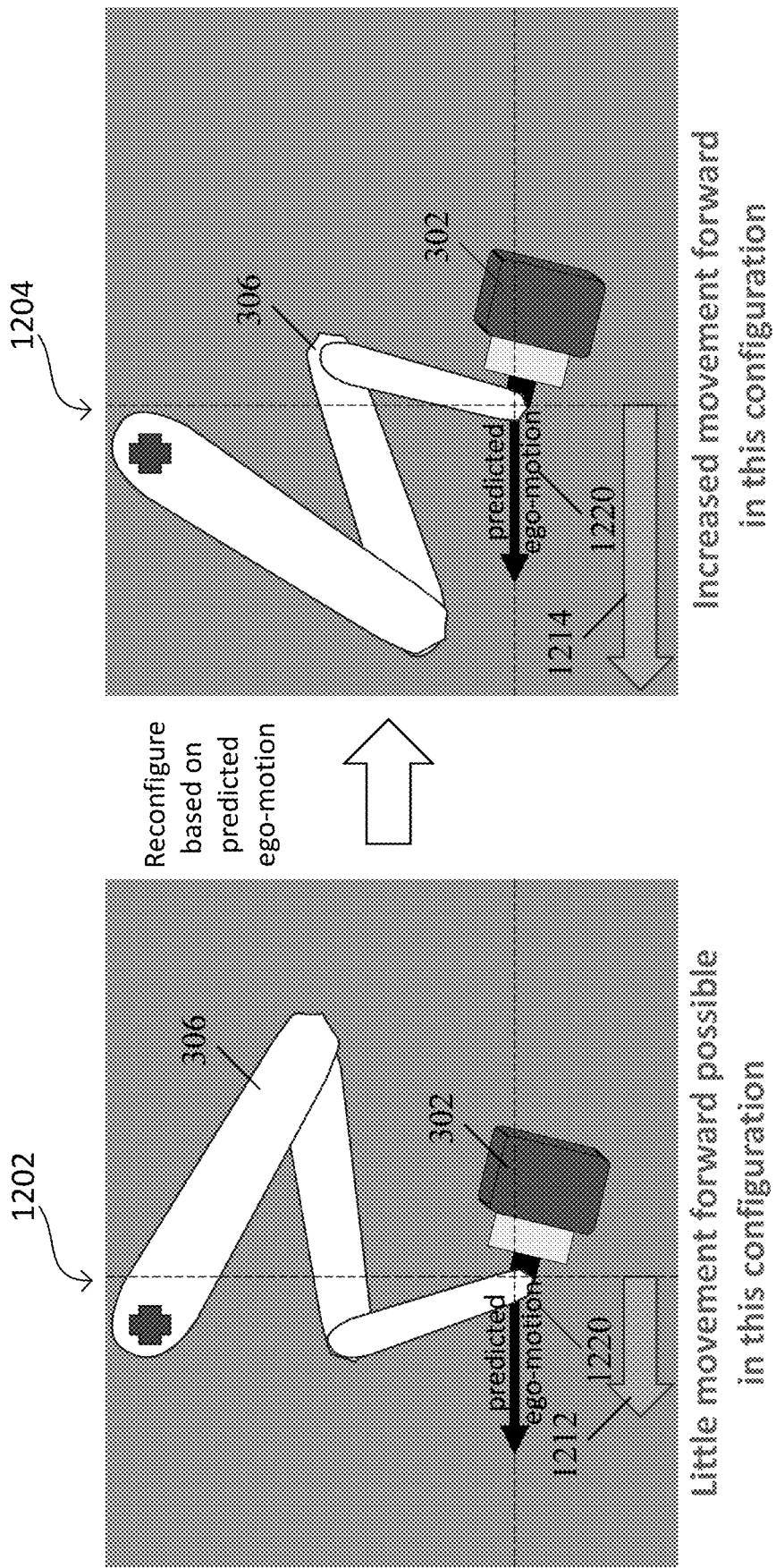
FIG. 12 shows a robotic arm reconfiguration for increased reachability.

FIG. 12 shows a robotic arm reconfiguration based on ego motion prediction. FIG. 12 shows a first robotic arm 306 position 1202. An XR viewing system may receive an ego-motion prediction as previously described. The XR viewing system may use ego-motion prediction 1220 is further optimize the robotic arm 306 movement. For example, the robotic arm 306 movement may optimize a solution of the inverse kinematic process so that the estimated future positions can still be smoothly reached. This means that the exact joint parameter values may be adjusted in advance to allow the exact configuration of the robot arm to be capable to change to the predicted new positions.

For example, scenario 1202 shows a first angles of robotic arm 306 and position of XR viewer 302. Based on the joint configuration of robotic arm 306, movement of XR viewer 302 is limited to movement 1212. Predicted ego-motion 1220 is larger than movement 1212. Based on the current robotic arm 306 joint configuration, movement based on predicted ego-motion 1220 is not possible.

Scenario 1204 shows a robotic arm 306 joint angle reconfiguration based on predicted ego-motion 1220. XR viewer 302 is in the same position in both scenario 1202 and 1204. However, in scenario 1204, the robot arm 306 joint configuration allows for movement 1214. Movement 1214 is larger than predicted ego-motion 1220. Therefore, robotic arm 306 may smoothly move XR viewer 302 into a position based on predicted ego-motion 1220. This is especially required when systems a higher number of degrees and many different solutions for the inverse kinematic as shown in FIGS. 7 and 8.

Herein, reference is made to various methods', processing chains, operations, computations, logical relations, models and functions, e.g., with respect to autonomous machines. It can be understood that the references made may be analogously apply to a controller and/or code segments implementing the methods, processing chains, operations, computations, logical relations, models, and functions.

In the following, examples of the present disclosure will be illustrated:

In Example 1 a device including a processor configured to: receive sensor measurements; determine a viewer position based on the received sensor measurements; generate a control signal based on the viewer position; and determine a view based on the viewer position.

In Example 2, the subject matter of Example 1 may optionally further include to receive a vehicle movement prediction, wherein the viewer position is further based on the vehicle movement prediction.

In Example 3, the subject matter of any of Examples 1 and 2 may optionally further include to receive a user movement prediction, wherein the viewer position is further based on the user movement prediction.

In Example 4, the subject matter of any of Examples 1 to 3 may optionally further include an extended reality viewer including a display.

In Example 5, the subject matter of any of Examples 1 to 4 may optionally further include a robotic arm, wherein in the extended reality viewer is mounted to the robotic arm.

In Example 6, the subject matter of any of Examples 1 to 5 may optionally further include one or more sensors configured to measure a force on the display.

In Example 7, the subject matter of any of Examples 1 to 6 may optionally further include wherein the control signal is configured to control the robotic arm to move the extended reality viewer to the viewer position.

In Example 8, the subject matter of any of Examples 1 to 7 may optionally further include to generate a display image based on the view.

In Example 9, the subject matter of any of Examples 1 to 8 may optionally further include wherein the display is configured to display the display image.

In Example 10, the subject matter of any of Examples 1 to 9 may optionally further include to transmit the control signal to the robotic arm.

In Example 11, the subject matter of any of Examples 1 to 10 may optionally further include to transmit the display image.

In Example 12, the subject matter of any of Examples 1 to 11 may optionally further include wherein the viewer position includes coordinates in 3 dimensions.

In Example 13, the subject matter of any of Examples 1 to 12 may optionally further include wherein the vehicle motion prediction is based on vehicle sensor information.

In Example 14, the subject matter of any of Examples 1 to 13 may optionally further include wherein the vehicle motion prediction is based on vehicle signal information.

In Example 15, the subject matter of any of Examples 1 to 14 may optionally further include wherein the vehicle motion prediction is based on environment map information.

In Example 16, the subject matter of any of Examples 1 to 15 may optionally further include wherein the user movement prediction is based on camera information.

In Example 17, the subject matter of any of Examples 1 to 16 may optionally further include wherein the user movement prediction is based on ultra-sonic tracking information.

In Example 18, the subject matter of any of Examples 1 to 17 may optionally further include wherein the user movement prediction is based on magnetic tracking information.

In Example 19, the subject matter of any of Examples 1 to 18 may optionally further include wherein the user movement prediction is based on user information from a wearable device.

In Example 20, the subject matter of any of Examples 1 to 19 may optionally further include a rail system, wherein the robotic arm is mounted to the rail system; and the control signal is further configured to control a robotic arm movement along the rail system.

In Example 21, the subject matter of any of Examples 1 to 20 may optionally further include an autonomous mobile robot, wherein the robotic arm is mounted to the robotic arm; and the control signal is further configured to control the autonomous mobile robot.

In Example 22 an extended reality viewer including: a display; a robotic arm connected to the display; one or more sensors configured to measure a force on the display; and a processor configured to: control the robotic arm to an arm position based on the force on the display, wherein the control adjusts a display position of the display; and display images on the display based on the display position.

In Example 23, the subject matter of Example 22 may optionally further include a memory coupled to the processor configured to: store a user information; and store a machine learning algorithm.

In Example 24, the subject matter of any of Examples 22 and 23 may optionally further include wherein the user information includes: a user height; and a user movement history.

In Example 25, the subject matter of any of Examples 22 to 24 may optionally further include wherein the machine learning algorithm predicts a user movement based in part on the stored user information.

In Example 26, the subject matter of any of Examples 22 to 25 may optionally further include wherein controlling the robotic arm includes moving the robotic arm at a velocity based on the force on the display.

In Example 27, the subject matter of any of Examples 22 to 26 may optionally further include a communication device configured to communicate with a user device; and wherein the processor is configured to determine a user based on the user device.

In Example 28, the subject matter of any of Examples 22 to 27 may optionally further include wherein the display is configured to fit over a user's eyes.

In Example 29, the subject matter of any of Examples 22 to 28 may optionally further include wherein the processor is further configured to: determine that a user is approaching an out-of-bounds zone; and generate an alert to the user based on approaching the out-of-bounds zone.

In Example 30, the subject matter of any of Examples 22 to 29 may optionally further include an audio device; and wherein the alert is an audible alert.

In Example 31, the subject matter of any of Examples 22 to 30 may optionally further include wherein the alert is a visual alert; and wherein the processor is further configured to display the alert on the display.

In Example 32, the subject matter of any of Examples 22 to 31 may optionally further include wherein the alert is an opposing force to the force on the display; and wherein the processor is further configured to control the robotic arm based on the opposing force.

In Example 33, the subject matter of any of Examples 22 to 32 may optionally further include wherein the robotic arm includes a base.

In Example 34, the subject matter of any of Examples 22 to 33 may optionally further include wherein the base is connected to a rail system; and the processor is further configured to move the robotic arm along the rail system based on the force on the display.

In Example 35, the subject matter of any of Examples 22 to 34 may optionally further include wherein the base is connected to an autonomous mobile robot; and the processor is further configured to move the autonomous mobile robot based on the force on the display.

In Example 36, the subject matter of any of Examples 22 to 35 may optionally further include wherein the robotic arm includes 6 degrees of freedom.

In Example 37, the subject matter of any of Examples 22 to 36 may optionally further include an optical sensor configured to measure a user movement.

In Example 38, the subject matter of any of Examples 22 to 37 may optionally further include an ultrasonic sensor configured to measure a user movement.

In Example 39, the subject matter of any of Examples 22 to 38 may optionally further include a housing, wherein the display may be stored in the housing.

In Example 40, the subject matter of any of Examples 22 to 39 may optionally further include wherein the housing includes a cleaning mechanism configured to clean the display.

In Example 41 a method including receiving sensor measurements; determining a viewer position based on the received sensor measurements; generating a control signal based on the viewer position; and determining a view based on the viewer position.

In Example 42, the subject matter of Example 41 may optionally further include to receiving a vehicle movement prediction, wherein the viewer position is further based on the vehicle movement prediction.

In Example 43, the subject matter of any of Examples 41 and 42 may optionally further include to receiving a user movement prediction, wherein the viewer position is further based on the user movement prediction.

In Example 44, the subject matter of any of Examples 41 to 43 may optionally further include wherein the control signal is configured to control a robotic arm to move an extended reality viewer to the viewer position.

In Example 45, the subject matter of any of Examples 41 to 44 may optionally further include to generating a display image based on the view.

In Example 46, the subject matter of any of Examples 41 to 45 may optionally further include transmitting the display image to an extended reality viewer.

In Example 47, the subject matter of any of Examples 41 to 46 may optionally further include to transmitting the control signal to the robotic arm.

In Example 48, the subject matter of any of Examples 41 to 47 may optionally further include wherein the viewer position includes coordinates in 3 dimensions.

In Example 49, the subject matter of any of Examples 41 to 48 may optionally further include wherein the vehicle motion prediction is based on vehicle sensor information.

In Example 50, the subject matter of any of Examples 41 to 49 may optionally further include wherein the vehicle motion prediction is based on vehicle signal information.

In Example 51, the subject matter of any of Examples 41 to 50 may optionally further include wherein the vehicle motion prediction is based on an environment map information.

In Example 52, the subject matter of any of Examples 41 to 51 may optionally further include wherein the user movement prediction is based on camera information.

In Example 53, the subject matter of any of Examples 41 to 52 may optionally further include wherein the user movement prediction is based on ultra-sonic tracking information.

In Example 54, the subject matter of any of Examples 41 to 53 may optionally further include wherein the user movement prediction is based on magnetic tracking information.

In Example 55, the subject matter of any of Examples 41 to 54 may optionally further include wherein the user movement prediction is based on user information from a wearable device.

In Example 56 a method including measuring a force on a display; controlling a robotic arm to an arm position based on the force on the display, wherein the control adjusts a display position of the display; and displaying images on the display based on the display position.

In Example 57, the subject matter of Examples 56 may optionally further include wherein a machine learning algorithm for predicting user movement based in part on a user information.

In Example 58, the subject matter of any of Examples 56 and 57 may optionally further include wherein controlling the robotic arm includes moving the robotic arm at a velocity based on the force on the display.

In Example 59, the subject matter of any of Examples 56 to 58 may optionally further include communicating with a user device; and determining a user based on the user device.

In Example 60, the subject matter of any of Examples 56 to 59 may optionally further include determining a user is approaching an out-of-bounds zone; and generating an alert to the user based on approaching the out-of-bounds zone.

In Example 61, the subject matter of any of Examples 56 to 60 may optionally further include alerting a user with an audible alert.

In Example 62, the subject matter of any of Examples 56 to 61 may optionally further include alerting a user with a visual alert.

In Example 63, the subject matter of any of Examples 56 to 62 may optionally further include controlling a robotic arm to generate an opposing force.

In Example 64, the subject matter of any of Examples 56 to 63 may optionally further include controlling the robotic arm along a rail system based on the force on the display.

In Example 65, the subject matter of any of Examples 56 to 64 may optionally further include controlling an autonomous mobile robot based on the force on the display.

In Example 66, the subject matter of any of Examples 56 to 65 may optionally further include controlling the robotic arm with 6 degrees of freedom.

In Example 67, the subject matter of any of Examples 56 to 66 may optionally further include wherein the housing includes a cleaning mechanism configured to clean the display.

In Example 67, a system including one or more devices according to Examples 1 to 40, configured to implement a method according to Examples 41 to 66.

In Example 68, one or more non-transitory computer readable media comprising programmable instructions thereon, that when executed by one or more processors of a device, cause the device to perform any one of the method of Examples 41 to 67.

In Example 69, a means for implementing any of the Examples 1 to 40.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature and are thus understood as capable of being implemented in a corresponding device. Likewise, it is appreciated that implementations of devices detailed herein are understood as capable of being implemented with a corresponding method. It is thus understood that a device corresponding to a method detailed herein may include one or more components configured to perform each element of the related method.

All acronyms defined in the above description additionally hold in all claims included herein.

What is claimed is:

1. A device comprising:
    a processor configured to:
        receive sensor measurements;
        determine a viewer position based on the received sensor measurements;
        generate a control signal based on the viewer position; and
        determine a view based on the viewer position;
    a robotic arm;
    a viewer mounted to the robotic arm; and
    one or more sensors in or on the viewer configured to measure a first force applied to the viewer;
    wherein the control signal is configured to control the robotic arm to move the viewer to the viewer position, wherein the robotic arm is configured to apply a resistance force to the viewer, wherein the magnitude of the resistance force varies based on the first force and the viewer position.

2. The device of claim 1, further configured to receive a vehicle movement prediction, wherein the viewer position is further based on the vehicle movement prediction.

3. The device of claim 1, further configured to receive a user movement prediction, wherein the viewer position is further based on the user movement prediction.

4. The device of claim 1, wherein the viewer mounted to the robotic arm is an extended reality viewer including a display.

5. The device of claim 4, wherein the force measured by the one or more sensors in or on the extended reality viewer is a force on the display.

6. The device of claim 4, further configured to generate a display image based on the view.

7. The device of claim 6, wherein the display is configured to display the display image.

8. The device of claim 1, further configured to receive an extended reality image, wherein the viewer position is further based on the extended reality image.

9. The device of claim 7, further configured to transmit the display image.

10. The device of claim 4, further comprising a rail system, wherein the robotic arm is mounted to the rail system; and
    the control signal is further configured to control a robotic arm movement along the rail system.

11. The device of claim 4, further comprising an autonomous mobile robot, wherein the robotic arm is mounted to the autonomous mobile robot; and
    the control signal is further configured to control the autonomous mobile robot.

12. The device of claim 1, wherein at least one of the one or more sensors is disposed between the viewer and the robotic arm.

13. A method comprising:
    receiving sensor measurements;
    determining a viewer position based on the received sensor measurements;
    generating a control signal based on the viewer position;
    controlling a robotic arm to move a viewer mounted to the robotic arm to the viewer position according to the control signal; and
    determining a view based on the viewer position;
    wherein the viewer mounted to the robotic arm includes one or more sensors in or on the viewer configured to measure a first force applied to the viewer, wherein the robotic arm is configured to apply a resistance force to the viewer, wherein the magnitude of the resistance force varies based on the first force and the viewer position.

14. The method of claim 13, further comprising receiving a vehicle movement prediction, wherein the viewer position is further based on the vehicle movement prediction.

15. The method of claim 13, further comprising receiving a user movement prediction, wherein the viewer position is further based on the user movement prediction.

16. The method of claim 13, wherein the viewer mounted to the robotic arm is an extended reality viewer.

17. The method of claim 13, further comprising generating a display image based on the view, and transmitting the display image to an extended reality viewer.

18. The method of claim 13, further comprising transmitting the control signal to a robotic arm.

19. The method of claim 15, further comprising:
    determining an obstacle within a user environment;
    determining that a user is approaching the obstacle based on the user movement prediction; and
    controlling the robotic arm to generate the resistance force, wherein the resistance force is in an opposite direction of a direction of the user movement prediction.

20. The method of claim 13, wherein at least one of the one or more sensors is disposed between the viewer and the robotic arm.

* * * * *